US011929034B2

(12) United States Patent

Koo et al.

(10) Patent No.: US 11,929,034 B2

(45) Date of Patent: Mar. 12, 2024

(54) DISPLAY DEVICE

(71) Applicant: Samsung Display Co., LTD., Yongin-si (KR)

(72) Inventors: Bon Yong Koo, Yongin-si (KR); Sun Hwa Lee, Yongin-si (KR); Su Jin Lee, Yongin-si (KR); Jae Yong Jang, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/685,722

(22) Filed: Mar. 3, 2022

(65) Prior Publication Data

US 2023/0035054 A1 Feb. 2, 2023

(30) Foreign Application Priority Data

Jul. 28, 2021 (KR) ........................ 10-2021-0099511

(51) Int. Cl.

*G09G 3/3275* (2016.01)

*G09G 3/3266* (2016.01)

(52) U.S. Cl.

CPC ......... *G09G 3/3275* (2013.01); *G09G 3/3266* (2013.01); *G09G 2300/0426* (2013.01)

(58) Field of Classification Search

None

See application file for complete search history.

(56) References Cited

U.S. PATENT DOCUMENTS

| | | | | |
|---|---|---|---|---|
| 10,133,426 | B2 | 11/2018 | Den Boer et al. | |
| 2008/0169460 | A1* | 7/2008 | Yoo | H05B 45/60 257/40 |
| 2009/0206764 | A1* | 8/2009 | Schemmann | H02H 9/001 315/241 R |
| 2019/0130835 | A1* | 5/2019 | Ka | G09G 3/3275 |
| 2019/0305065 | A1* | 10/2019 | Kim | H01L 27/1255 |
| 2021/0028261 | A1* | 1/2021 | Lee | H10K 59/121 |
| 2021/0125562 | A1* | 4/2021 | Li | G09G 3/3258 |

(Continued)

FOREIGN PATENT DOCUMENTS

| | | |
|---|---|---|
| CN | 107039004 | 8/2017 |
| CN | 110660346 | 1/2020 |
| KR | 10-2017-0038345 | 4/2017 |

*Primary Examiner* — Nitin Patel

*Assistant Examiner* — Amen W Bogale

(74) *Attorney, Agent, or Firm* — KILE PARK REED & HOUTTEMAN PLLC

(57) ABSTRACT

A display device includes a first pixel. The first pixel includes a first light emitting unit electrically connected between a first power line and a second power line. A first driving transistor is electrically connected between the first power line and the first light emitting unit, and controls a current flowing into the first light emitting unit, based on a first data signal from a first data line to a gate electrode. A first initialization transistor is electrically connected between the gate electrode of the first driving transistor and a third power line. A first switching transistor is electrically connected between a first electrode of the first light emitting unit and a first sub-power line. The first light emitting unit includes light emitting elements. The first driving transistor includes a first semiconductor material, and the first initialization transistor includes a second semiconductor material different from the first semiconductor material.

20 Claims, 17 Drawing Sheets

(56) References Cited

U.S. PATENT DOCUMENTS

| | | | | |
|---|---|---|---|---|
| 2021/0134877 | A1* | 5/2021 | Kim | H01L 27/156 |
| 2021/0158763 | A1* | 5/2021 | Hung | G09G 3/3291 |
| 2022/0189417 | A1* | 6/2022 | Ji | G09G 3/3275 |

* cited by examiner

GAT1: Cst_E1, E1, S11, S21, S31, S41
GAT2: Cst_E2, PL3
SD1: BRP1~BRP5, PL_T1~PL_T3
SD2: BRP6, D1~D4, PL1

ACT: ACT1, ACT2
ACT1: ACT_S1, ACT_S2, ACT_S3
T3: T3-1, T3-2
T4: T4-1, T4-2

ACT: SCL
GAT1: GE1, S11, E1, Cst_E1
GAT2: Cst_E2
SD1: BRP4, PL_T1
SD2: BRP6, D2, PL1

DISPLAY DEVICE

CROSS-REFERENCE TO RELATED APPLICATION(S)

This application claims priority to and benefits of Korean patent application 10-2021-0099511 under 35 U.S.C. § 119 filed on Jul. 28, 2021, in the Korean Intellectual Property Office, the entire contents of which are incorporated herein by reference.

BACKGROUND

1. Technical Field

The disclosure generally relates to a display device.

2. Description of the Related Art

Recently, as interest in information displays is increased, research and development of display devices have been continuously conducted.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Embodiments provide a display device capable of readily performing a test on whether light emitting elements constituting a light emitting unit have been normally bonded to a pixel electrode.

A display device may include a first pixel, wherein the first pixel may include a first light emitting unit electrically connected between a first power line and a second power line; a first driving transistor electrically connected between the first power line and the first light emitting unit, the first driving transistor controlling a current flowing into the first light emitting unit, based on a first data signal from a first data line to a gate electrode of the first driving transistor; a first initialization transistor electrically connected between the gate electrode of the first driving transistor and a third power line; and a first switching transistor electrically connected between a first electrode of the first light emitting unit and a first sub-power line, the first light emitting unit may include light emitting elements, and the first driving transistor may include a first semiconductor material, and the first initialization transistor may include a second semiconductor material different from the first semiconductor material.

The first driving transistor may include a silicon semiconductor, and the first initialization transistor may include an oxide semiconductor.

The first sub-power line may be electrically disconnected from the third power line.

The display device may further include a second pixel. The second pixel may include a second light emitting unit electrically connected between the first power line and the second power line; a second driving transistor electrically connected between the first power line and the second light emitting unit, the second driving transistor controlling a current flowing into the second light emitting unit, based on a second data signal from a second data line to a gate electrode of the second driving transistor; a second initialization transistor electrically connected between the gate electrode of the second driving transistor and the third power line; and a second switching transistor electrically connected between a first electrode of the second light emitting unit and a second sub-power line. The second sub-power line may be electrically disconnected from the first sub-power line.

The display device may further include a power supply. The power supply may apply a same voltage to the first sub-power line and the second sub-power line in a first mode; and the power supply may apply different test signals respectively to the first sub-power line and the second sub-power line in a second mode.

The power supply may sequentially apply the test signals to the first sub-power line and the second sub-power line in the second mode.

The display device may further include a third pixel. The third pixel may include a third light emitting unit electrically connected between the first power line and the second power line; a third driving transistor electrically connected between the first power line and the third light emitting unit, the third driving transistor controlling a current flowing into the third light emitting unit, based on a third data signal from a third data line to a gate electrode of the third driving transistor; a third initialization transistor electrically connected between the gate electrode of the third driving transistor and the third power line; and a third switching transistor electrically connected between a first electrode of the third light emitting unit and a third sub-power line. The third sub-power line may be electrically disconnected from the first sub-power line and the second sub-power line.

The first pixel may emit light of a first color, the second pixel may emit light of a second color, the third pixel may emit light of a third color, and the first color, the second color, and the third color may be different colors.

The display device may further include a fourth pixel. The fourth pixel may include a fourth light emitting unit electrically connected between the first power line and the second power line; a fourth driving transistor electrically connected between the first power line and the fourth light emitting unit, the fourth driving transistor controlling a current flowing into the fourth light emitting unit, based on a fourth data signal from a fourth data line to a gate electrode of the fourth driving transistor; a fourth initialization transistor electrically connected between the gate electrode of the fourth driving transistor and the third power line; and a fourth switching transistor electrically connected between a first electrode of the fourth light emitting unit and a fourth sub-power line. The fourth data line may be electrically disconnected from the first data line and the second data line. The fourth sub-power line may be electrically connected to the first sub-power line.

The first pixel and the fourth pixel may emit light of a first color.

The first data line, the second data line, the first sub-power line, and the second sub-power line may extend in a first direction in a plan view.

The second data line may partially overlap the first sub-power line in a plan view.

The light emitting elements may be spaced apart from each other at a same distance on the first electrode of the first light emitting unit.

Each of the light emitting elements may include a second semiconductor layer; an active layer; and a first semiconductor layer, the second semiconductor layer, the active layer, and the first semiconductor layer are sequentially stacked on the first electrode of the first light emitting unit.

The first pixel may further include a bypass transistor electrically connected between the first electrode of the first light emitting unit and a fourth power line. A gate electrode of the first switching transistor may be electrically connected to the first sub-power line.

The first switching transistor may include the second semiconductor material.

A display device may include a first pixel, wherein the first pixel may include a first light emitting unit electrically connected between a first power line and a second power line; a first driving transistor electrically connected between the first power line and the first light emitting unit, the first driving transistor controlling a current flowing into the first light emitting unit, based on a first data signal from a first data line; and a first switching transistor electrically connected between a first electrode of the first light emitting unit and a first sub-power line, the first switching transistor having a gate electrode electrically connected to the first sub-power line, and the first driving transistor may include a first semiconductor material, and the first switching transistor may include a second semiconductor material different from the first semiconductor material.

The first driving transistor may include a silicon semiconductor, and the first switching transistor may include an oxide semiconductor.

The display device may further include a second pixel. The second pixel may include a second light emitting unit electrically connected between the first power line and the second power line; a second driving transistor electrically connected between the first power line and the second light emitting unit, the second driving transistor controlling a current flowing into the second light emitting unit, based on a second data signal from a second data line; and a second switching transistor electrically connected between a first electrode of the second light emitting unit and a second sub-power line, the second switching transistor having a gate electrode electrically connected to the second sub-power line. The second sub-power line may be electrically disconnected from the first sub-power line.

The first data line, the second data line, the first sub-power line, and the second sub-power line may extend in a first direction in a plan view.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1:
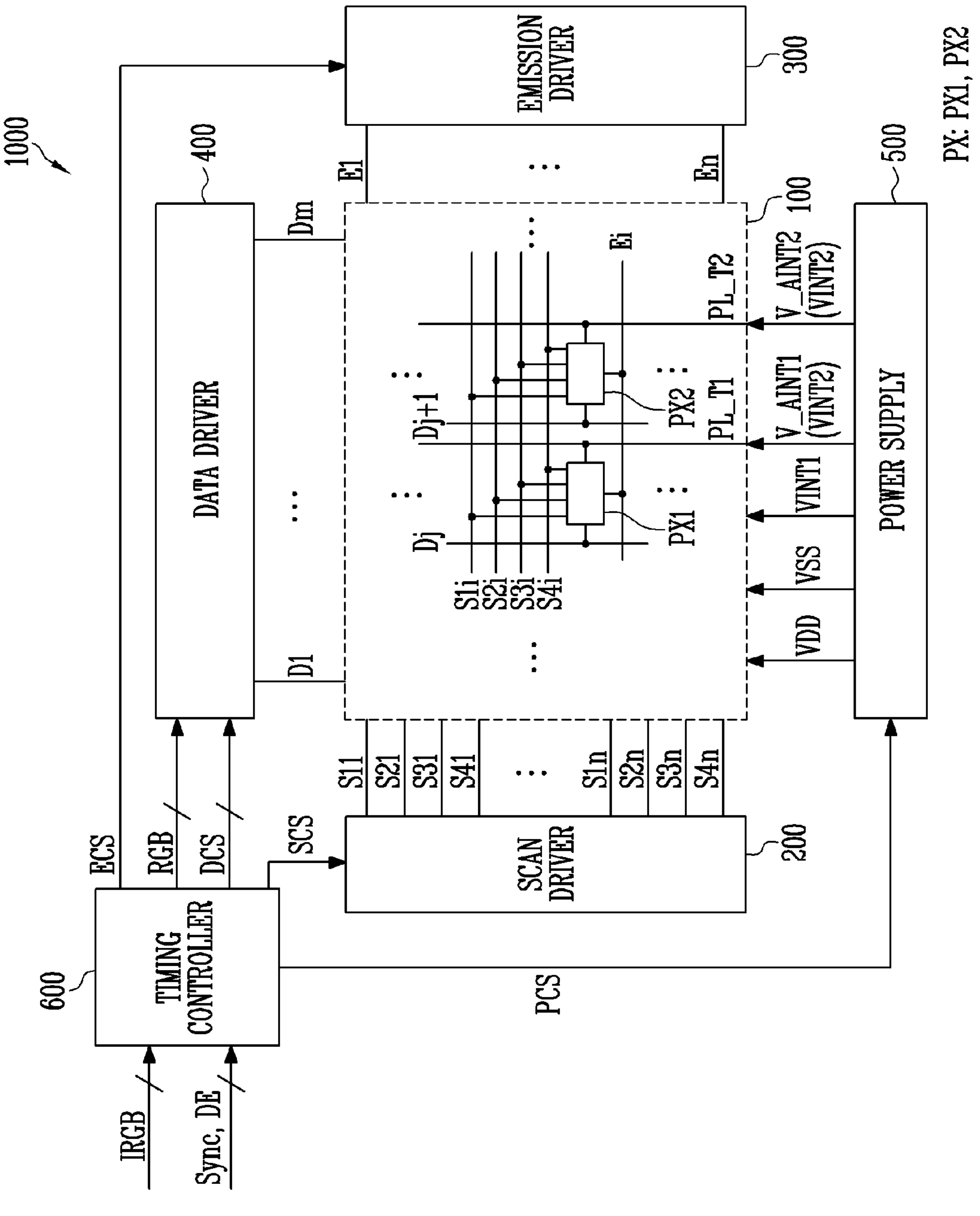
FIG. 1 is a block diagram illustrating a display device in accordance with embodiments.

The disclosure may apply various changes. However, the examples herein are not limited to certain shapes but apply to all the changes and equivalent materials and replacements. The drawings included are illustrated for a further understanding of the disclosure.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that in case that an element is referred to as being "between" two elements, it can be the only element between the two elements, or one or more intervening elements may also be present. Like reference numerals refer to like elements throughout.

In the drawings, the thickness of certain lines, layers, components, elements or features may be exaggerated for clarity.

As used herein, the singular forms, "a," "an," and "the" are intended to include the plural forms as well, unless the context clearly indicates otherwise.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

It will be understood that, although the terms "first", "second", etc. may be used herein to describe various elements, these elements should not be limited by these terms. These terms are only used to distinguish one element from another element. Thus, a "first" element discussed below could also be termed a "second" element without departing from the teachings of the disclosure. As used herein, the singular forms are intended to include the plural forms as well, unless the context clearly indicates otherwise.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

When an element is described as 'not overlapping' or 'to not overlap' another element, this may include that the elements are spaced apart from each other, offset from each other, or set aside from each other or any other suitable term as would be appreciated and understood by those of ordinary skill in the art.

The terms "face" and "facing" mean that a first element may directly or indirectly oppose a second element. In a case in which a third element intervenes between the first and second element, the first and second element may be understood as being indirectly opposed to one another, although still facing each other.

It will be further understood that the terms "comprises," "comprising," "includes," and/or "including,", "has," "have," and/or "having," and variations thereof when used in this specification, specify the presence of stated features, integers, steps, operations, elements, and/or components, but do not preclude the presence and/or addition of one or more other features, integers, steps, operations, elements, components, and/or groups thereof.

Further, an expression that an element such as a layer, region, substrate or plate is placed "on" or "above" another element indicates not only a case where the element is placed "directly on" or "just above" the other element but also a case where a further element is interposed between the element and the other element. On the contrary, an expression that an element such as a layer, region, substrate or plate is placed "beneath" or "below" another element indicates not only a case where the element is placed "directly beneath" or "just below" the other element but also a case where a further element is interposed between the element and the other element.

In this specification, it will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. Also, in this specification, the term "connection" or "coupling" may inclusively mean connection or physical and/or electrical coupling.

Embodiments are described in the accompanying drawings in relation to functional blocks, units, and/or modules. Those skilled in the art will understand that these blocks, units, and/or modules are physically implemented by logic circuits, individual components, microprocessors, hard wire circuits, memory elements, line connection, and other electronic circuits. This may be formed by using semiconductor-based manufacturing techniques or other manufacturing techniques. In the case of blocks, units, and/or modules implemented by microprocessors or other similar hardware, the units, and/or modules are programmed and controlled by using software, to perform various functions discussed in the disclosure, and may be selectively driven by firmware and/or software. In addition, each block, each unit, and/or each module may be implemented by dedicated hardware or by a combination of dedicated hardware to perform some functions of the block, the unit, and/or the module and a processor (for example, one or more programmed microprocessors and associated circuitry) to perform other functions of the block, the unit, and/or the module. In an embodiment, the blocks, the units, and/or the modules may be physically separated into two or more individual blocks, two or more individual units, and/or two or more individual modules without departing from the scope of the disclosure. Also, in an embodiment, the blocks, the units, and/or the modules may be physically combined into more complex blocks, more complex units, and/or more complex modules without departing from the scope of the disclosure.

The phrase "in a plan view" means viewing the object from the top, and the phrase "in a schematic cross-sectional view" means viewing a cross-section of which the object is vertically cut from the side.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined or implied herein, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments and items required for those skilled in the art to readily understand the content of the disclosure will be described in detail with reference to the accompanying drawings.

Figure 2:
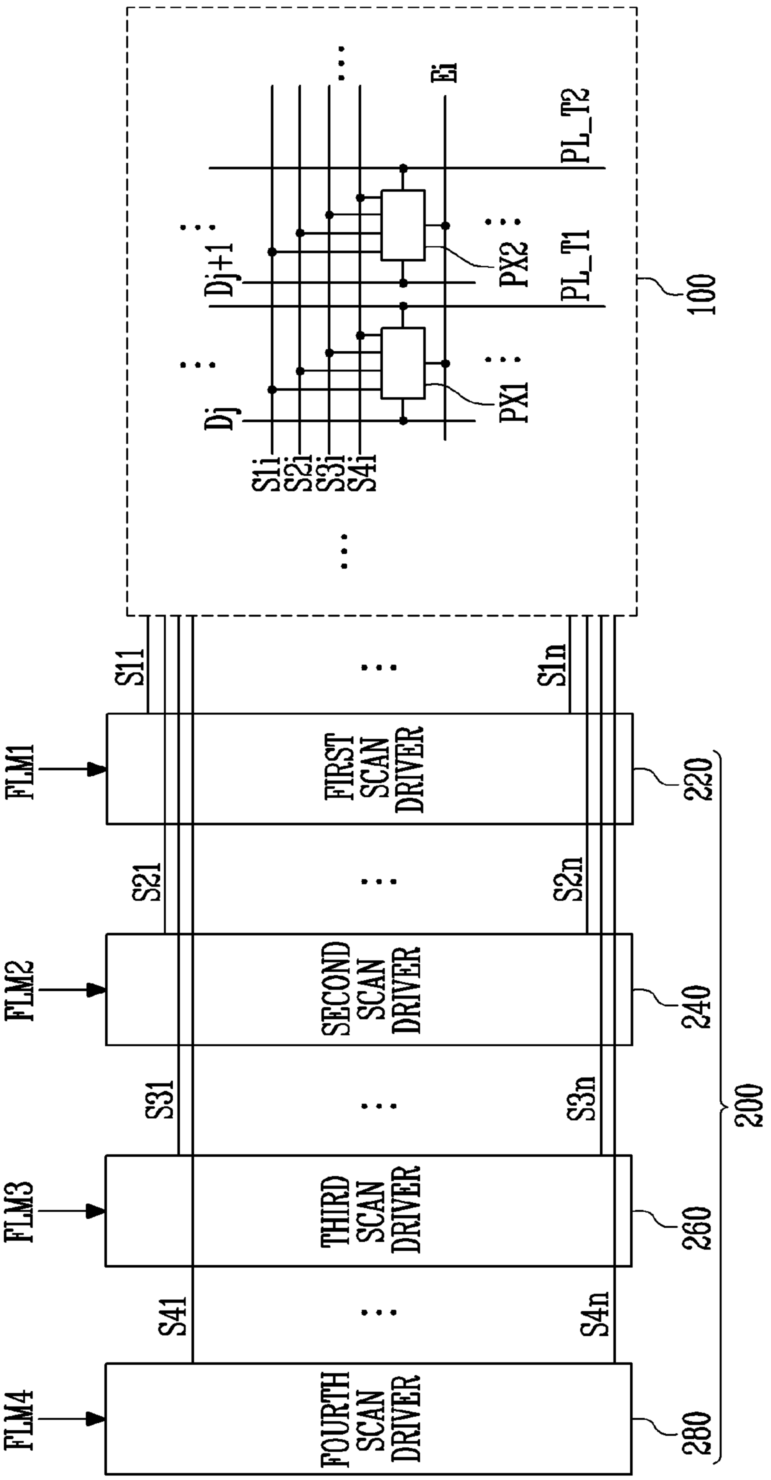
FIG. 2 is a diagram illustrating an embodiment of a scan driver included in the display device shown in FIG. 1.

FIG. 1 is a block diagram illustrating a display device in accordance with embodiments. FIG. 2 is a diagram illustrating an embodiment of a scan driver included in the display device shown in FIG. 1.

Referring to FIGS. 1 and 2, the display device 1000 may include a display panel 100, a scan driver 200, an emission driver 300, a data driver 400, a power supply 500, and a timing controller 600.

The display panel 100 may include scan lines S1 to S1$n$, S21 to S2$n$, S31 to S3$n$, and S41 to S4$n$, emission control lines E1 to En, and data lines D1 to Dm, and include pixels PX connected to the scan lines S11 to S1$n$, S21 to S2$n$, S31 to S3*n*, and S41 to S4*n*, the emission control lines E1 to En, and the data lines D1 to Dm (m and n are integers greater than 1). For example, a first pixel PX1 located (or disposed) on an ith horizontal line (or ith pixel row) and a jth vertical line (or jth pixel column) may be connected to a 1ith scan line S1*i*, a 2ith scan line S2*i*, a 3ith scan line S3*i*, a 4ith scan line S4*i*, and a jth data line Dj (i and j are natural numbers). Also, the first pixel PX1 may be connected to a first sub-power line PL_T1 (or first test power line). For example, a second pixel PX2 located on the ith horizontal line (or ith pixel row) and a (j+1)th vertical line (or (j+1)th pixel column) may be connected to the 1ith scan line S1*i*, the 2ith scan line S2*i*, the 3ith scan line S3*i*, the 4ith scan line S4*i*, and a (j+1)th data line Dj+1. Also, the second pixel PX2 may be connected to a second sub-power line PL_T2 (or second test power line). The second sub-power line PL_T2 may be electrically separated or disconnected from the first sub-power line PL_T1, or may not be electrically connected to the first sub-power line PL_T1.

Each of the pixels PX may include a driving transistor and switching transistors. The pixel PX may be supplied with voltages of a first driving power source VDD, a second driving power source VSS, and a first initialization power source VINT1 from the power supply 500. A voltage level of the second driving power source VSS may be lower than that of the first driving power source VDD. For example, the voltage of the first driving power source VDD may be a positive voltage, and the voltage of the second driving power source VSS may be a negative voltage. The first initialization power source VINT1 may be a power source for initializing the pixel PX. For example, the driving transistor included in the pixel PX may be initialized by the voltage of the first initialization power source VINT1. The voltage of the first initialization power source VINT1 may be a negative voltage.

Also, the pixel PX may be supplied with a voltage of a second initialization power source VINT2 or first and second test signals V_AINT1 and V_AINT2 from the power supply 500 through the first and second sub-power lines PL_T1 and PL_T2. The second initialization power source VINT2 may be a power source for initializing the pixel PX. For example, a light emitting element included in the pixel PX may be initialized by the voltage of the second initialization power source VINT2. The voltage of the second initialization power source VINT2 may be a negative voltage.

For example, in a first mode, the pixel PX may be supplied with the voltage of the second initialization power source VINT2 from the power supply 500 through the first and second sub-power lines PL_T1 and PL_T2. For example, in a second mode, the first pixel PX1 may be supplied with the first test signal V_AINT1 from the power supply 500 through the first sub-power line PL_T1. For example, in the second mode, the second pixel PX2 may be supplied with the second test signal V_AINT2 from the power supply 500 through the second sub-power line PL_T2.

The first mode may be a mode for displaying a normal image, and the second mode may be a mode for testing whether the pixel PX normally emits light or measuring a characteristic of the pixel PX (for example, a mode for a lighting test). Each of the first and second test signals V_AINT1 and V_AINT2 may be a signal for allowing the pixel PX to periodically emit light or not to periodically emit light. For example, each of the first and second test signals V_AINT1 and V_AINT2 may be a square wave, and alternately have a voltage for allowing the pixel PX to emit light and a voltage for allowing the pixel PX not to emit light (or a voltage higher than a threshold voltage of the light emitting element in the pixel PX and a voltage lower than the threshold voltage).

In an embodiment, signal lines connected to the pixel PX may be variously set corresponding to a circuit structure of the pixel PX.

The scan driver 200 may receive a first control signal SCS from the timing controller 600, and supply a first scan signal, a second scan signal, a third scan signal, and a fourth scan signal respectively to first scan lines S11 to S1*n*, second scan lines S21 to S2*n*, third scan lines S31 to S3*n*, and fourth scan lines S41 to S4*n*, based on the first control signal SCS.

The first to fourth scan signals may be set to a gate-on voltage corresponding to a type of transistors to which the corresponding scan signals are supplied. The transistors may be turned on or set to a turn-on state in response to the gate-on voltage. For example, the gate-on voltage of a scan signal supplied to a P-channel metal oxide semiconductor (PMOS) transistor may have a logic low level, and the gate-on voltage of a scan signal supplied to an N-channel metal oxide semiconductor (NMOS) transistor may have a logic high level. Hereinafter, it will be understood that the term "that a scan signal is supplied" means that the scan signal is supplied with a logic level at which a transistor controlled by the scan signal is turned on.

For convenience of description, a case where the scan driver 200 is a single component has been illustrated in FIG. 1, but the disclosure is not limited thereto. The scan driver 200 may include scan drivers which respectively supply at least one of the first to fourth scan signals according to a design.

Referring to FIG. 2, the scan driver 200 may include a first scan driver 220, a second scan driver 240, a third scan driver 260, and a fourth scan driver 280.

The first control signal SCS may include first to fourth scan start signals FLM1 to FLM4 and clock signals. The first to fourth scan start signals FLM1 to FLM4 may be respectively supplied to the first to fourth scan drivers 220, 240, 260, and 280. A pulse width, a supply timing, and the like of each of the first to fourth scan start signals FLM1 to FLM4 may be determined according to a driving condition of the pixel PX and a frame frequency.

The first to fourth scan drivers 220 to 280 may respectively output the first to fourth scan signals, based on the first to fourth scan start signals FLM1 to FLM4. The first scan driver 220 may sequentially supply the first scan signal to the first scan lines S11 to S1*n* in response to the first scan start signal FLM1. The second scan driver 240 may sequentially supply the second scan signal to the second scan lines S21 to S2*n* in response to the second scan start signal FLM2. The third scan driver 260 may sequentially supply the third scan signal to the third scan lines S31 to S3*n* in response to the third scan start signal FLM3. The fourth scan driver 280 may sequentially supply the fourth scan signal to the fourth scan lines S41 to S4*n* in response to the fourth scan start signal FLM4.

Each of the first to fourth scan drivers 220, 240, 260, and 280 may be implemented as a shift register which sequentially generates and outputs a scan signal in a pulse form by sequentially shifting a scan start signal in a pulse form (for example, a corresponding scan start signal among the first to fourth scan start signals FLM1 to FLM4), using the clock signals.

Referring back to FIG. 1, the emission driver 300 may supply an emission control signal to the emission control lines E1 to En, based on a second control signal ECS. For example, the emission control signal may be sequentially supplied to the emission control lines E1 to En.

The emission control signal may be set to a gate-off voltage (for example, a logic high level). A transistor receiving the emission control signal may be turned off in case that the emission control signal is supplied, and be set to the turn-on state in other cases. Hereinafter, it will be understood that the term “that the emission control signal is supplied” means that the emission control signal is supplied with a logic level at which a transistor controlled by the emission control signal is turned off.

The second control signal ECS may include an emission start signal and clock signals, and the emission driver 300 may be implemented as a shift register which sequentially generates and outputs the emission control signal in a pulse form by sequentially shifting the emission start signal in a pulse form, using the clock signals.

The data driver 400 may receive a third control signal DCS from the timing controller 600. The data driver 400 may convert image data RGB in a digital form into an analog data signal (for example, a data signal). The data driver 400 may supply a data signal to the data lines D1 to Dm, corresponding to the third control signal DCS. The data signal supplied to the data lines D1 to Dm may be supplied to be synchronized with the fourth scan signal supplied to the fourth scan lines S41 to S4*n*.

The third control signal DCS may include a load signal (or data enable signal) instructing output of a valid data signal, a horizontal start signal, a data clock signal, and the like within the spirit and the scope of the disclosure. For example, the data driver 400 may include a shift register which generates a sampling signal by shifting the horizontal start signal in synchronization with the data clock signal, a latch which latches image data RGB in response to the sampling signal, a digital-analog converter (or decoder) which converts the latched image data (for example, data in a digital form) into data signals in an analog form, and buffers (or amplifiers) which output the data signals to the data lines D1 to Dm.

The power supply 500 may supply, to the display panel 100, the voltage of the first driving power source VDD and the voltage of the second driving power source VSS, which are used for driving the pixel PX. Also, the power supply 500 may supply the voltage of the first initialization power source VINT1 to the display panel 100. The power supply 500 may be implemented as a power management integrated circuit (PMIC).

In an embodiment, in the first mode, the power supply 500 may supply the voltage of the second initialization power source VINT2 to the first and second sub-power lines PL_T1 and PL_T2. In the second mode different from the first mode, the power supply 500 may supply the first and second test signals V_AINT1 and V_AINT2 respectively to the first and second sub-power lines PL_T1 and PL_T2.

In an embodiment, a maximum voltage level (or minimum voltage level) of the first test signal V_AINT1 may be different from a maximum voltage level (or minimum voltage level) of the second test signal V_AINT2. For example, in case that the first pixel PX1 and the second pixel PX2 emit lights of different colors, the first test signal V_AINT1 may have a voltage corresponding to a maximum luminance of the first pixel PX1 emitting light of a first color or a threshold voltage of a light emitting element in the first pixel PX1, and the second test signal V_AINT2 may have a voltage corresponding to a maximum luminance of the second pixel PX2 emitting light of a second color or a threshold voltage of a light emitting element in the second pixel PX2.

The timing controller 600 may be supplied with input image data IRGB and control signals which includes a synchronization signal Sync and a data enable signal DE from a host system such as an Application Processor (AP) through an interface.

The timing controller 600 may generate the first control signal SCS, the second control signal ECS, the third control signal DCS, and a fourth control signal PCS, based on the input image data IRGB, a synchronization signal Sync (for example, a vertical synchronization signal, a horizontal synchronization signal, etc.), a data enable signal DE, a clock signal, and the like within the spirit and the scope of the disclosure. The first control signal SCS may be supplied to the scan driver 200, the second control signal ECS may be supplied to the emission driver 300, the third control signal DCS may be supplied to the data driver 400, and the fourth control signal PCS may be supplied to the power supply 500. The timing controller 600 may generate image data RGB (or frame data) by rearranging the input image data IRGB, corresponding to the arrangement of the pixels PX in the display panel 100.

At least one of the scan driver 200, the emission driver 300, the data driver 400, the power supply 500, and the timing controller 600 may be formed in the display panel 100, or be implemented as an integrated circuit to be connected in a tape carrier package form to the display panel 100. Also, at least two of the scan driver 200, the emission driver 300, the data driver 400, the power supply 500, and the timing controller 600 may be implemented as one integrated circuit. For example, the data driver 400 and the timing controller 600 may be implemented as one integrated circuit.

Figure 3:
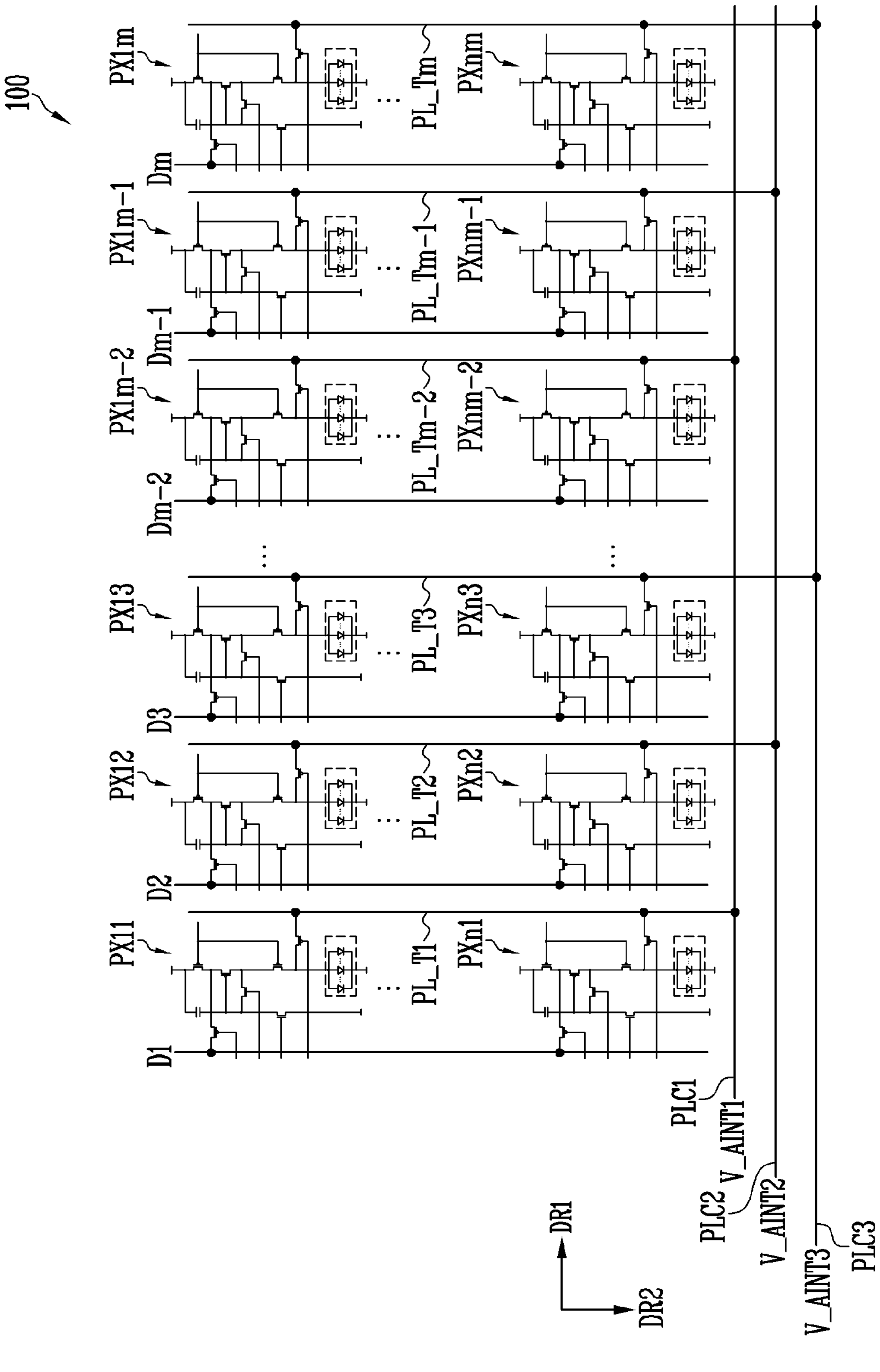
FIG. 3 is a schematic circuit diagram illustrating an embodiment of a display panel included in the display device shown in FIG. 1.

FIG. 3 is a schematic circuit diagram illustrating an embodiment of the display panel included in the display device shown in FIG. 1.

Referring to FIGS. 1 and 3, the display panel 100 may include data lines D1 to Dm, sub-power lines PL_T1 to PL_Tm, common power lines PLC1 to PLC3, and pixels PX11 to PXnm. The data lines D1 to Dm, the sub-power lines PL_T1 to PL_Tm, and the pixels PX11 to PXnm may be located in a display area in which an image is displayed, and the common power lines PLC1 to PLC3 may be located in a non-display area in which the image is not displayed.

The data lines D1 to Dm and the sub-power lines PL_T1 to PL_Tm may extend in a second direction DR2, and be arranged (or disposed) along a first direction DR1. The common power lines PLC1 to PLC3 may extend in the first direction DR1, and be connected (or electrically connected) to at least one of the sub-power lines PL_T1 to PL_Tm.

In other words, the sub-power lines PL_T1 to PL_Tm may be connected one of the common power lines PLC1 to PLC3. For example, a first sub-power line PL_T1 may be connected to a first common power line PLC1. A second sub-power line PL_T2 may be connected to a second common power line PLC2. A third sub-power line PL_T3 may be connected to a third common power line PLC3. An (m−2)th sub-power line PL_Tm−2 may be connected to the first common power line PLC1. An (m−1)th sub-power line PL_Tm−1 may be connected to the second common power line PLC2. An mth sub-power line PL_Tm may be connected to the third common power line PLC3. For example, a (3(x−1)+1)th sub-power line may be connected to the first common power line PLC1 (x is a positive integer), a (3(x−1)+2)th sub-power line may be connected to the second common power line PLC2, and a 3xth sub-power line may be connected to the third common power line PLC3.

The pixels PX11 to PXnm may be connected (or electrically connected) to one of the data lines D1 to Dm and one of the sub-power lines PL_T1 to PL_Tm. For example, each of eleventh to nith pixels PX11 to PXn1 located on a first vertical line (or first pixel column) may be connected to a first data line D1 and the first sub-power line PL_T1. Each of twelfth to n2th pixels PX12 to PXn2 located on a second vertical line (or second pixel column) may be connected to a second data line D2 and the second sub-power line PL_T2. Each of thirteenth to n3th pixels PX13 to PXn3 located on a third vertical line (or third pixel column) may be connected to a third data line D3 and the third sub-power line PL_T3. Each of lmth to nmth pixels PX1*m* to PXnm located on an mth vertical line (or mth pixel column) may be connected to an mth data line Dm and the mth sub-power line PL_Tm.

In an embodiment, the eleventh to nith pixels PX11 to PXn1 located on the first vertical line (or first pixel column) and (1m−2)th to (nm−2)th pixels PX1*m*−2 to PXnm−2 located on an (m−2)th vertical line (or (m−2)th pixel column) may emit light of a first color, the twelfth to n2th pixels PX12 to PXn2 located on the second vertical line (or second pixel column) and (1m−1)th to (nm−1)th pixels PX1*m*−1 to PXnm−1 located on an (m−1)th vertical line (or (m−1)th pixel column) may emit light of a second color, and the thirteenth to n3th pixels PX13 to PXn3 located on the third vertical line (or third pixel column) and the 1mth to nmth pixels PX1*m* to PXnm located on the mth vertical line (or mth pixel column) may emit light of a third color. The first color, the second color, and the third color may be different from one another. For example, the first color may be red, the second color may be green, and the third color may be blue.

In an embodiment, in the second mode, test signals V_AINT1 to V_AINT3 may be provided to the common power lines PLC1 to PLC3. For example, a first test signal V_AINT1 may be provided to the first common power line PLC1. The first test signal V_AINT1 may be provided to first color pixels (for example, the eleventh to nith pixels PX11 to PXn1 and the (1m−2)th to (nm−2)th pixels PX1*m*−2 to PXnm−2) emitting light of the first color, and a lighting test may be performed on the first color pixels. For example, a second test signal V_AINT2 may be provided to the second common power line PLC2. The second test signal V_AINT2 may be provided to second color pixels (for example, the twelfth to n2th pixels PX12 to PXn2 and the (1m−1)th to (nm−1)th pixels PX1*m*−1 to PXnm−1) emitting light of the second color, and a lighting test may be performed on the second color pixels. For example, a third test signal V_AINT3 may be provided to the third common power line PLC3. The third test signal V_AINT3 may be provided to third color pixels (for example, the thirteenth to n3th pixels PX13 to PXn3 and the lmth to nmth pixels PX1*m* to PXnm) emitting light of the third color, and a lighting test may be performed on the third color pixels.

Although three common power lines PLC1 to PLC3 have been illustrated in FIG. 3, this is merely illustrative, and the number of common power lines PLC1 to PLC3 is not limited thereto. For example, in case that the pixels PX11 to PXnm include four kinds of pixels (for example, first to fourth color pixels), the display panel 100 may include four common power lines (for example, common power lines to which test signals for the first to fourth color pixels are respectively provided). Each of the four common power lines may be connected to corresponding pixels (for example, pixels emitting light of a color corresponding to a corresponding test signal) through the sub-power lines PL_T1 to PL_Tm.

Figure 4:
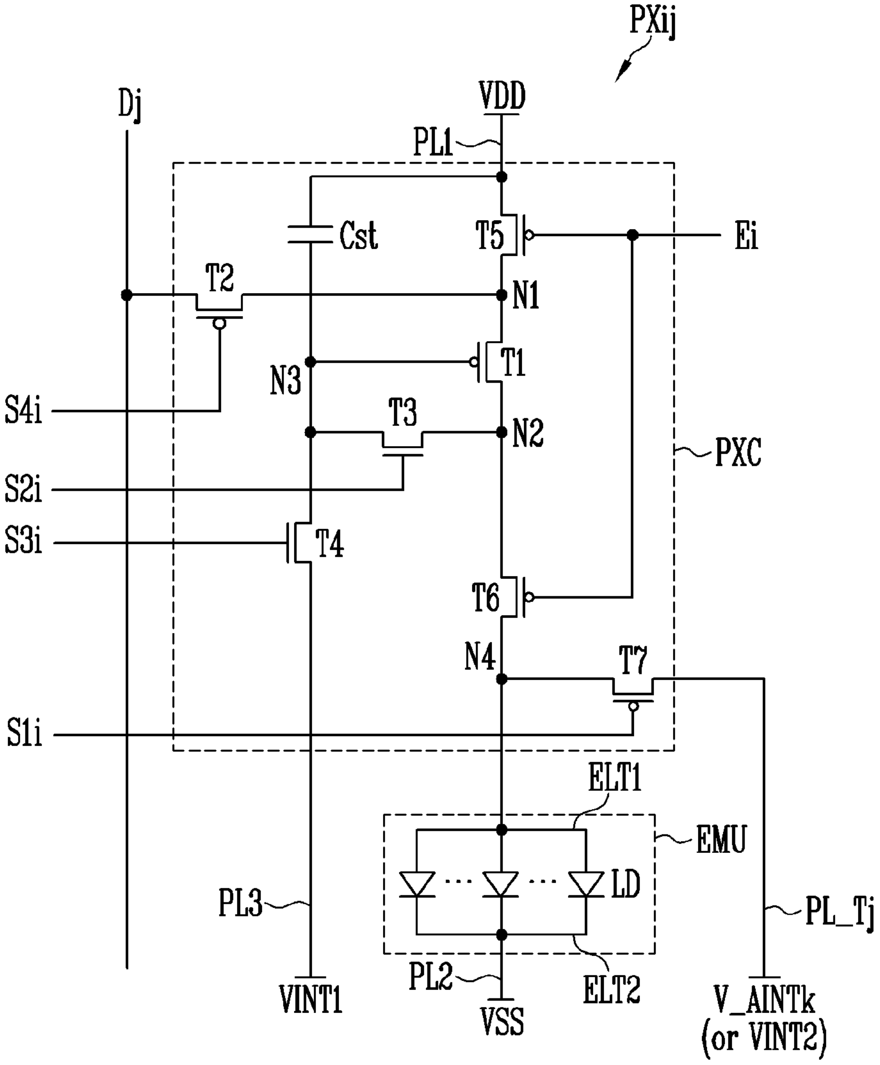
FIG. 4 is a schematic circuit diagram illustrating an embodiment of a pixel included in the display panel shown in FIG. 3.

FIG. 4 is a schematic circuit diagram illustrating an embodiment of the pixel included in the display panel shown in FIG. 3. The pixels PX11 to PXnm included in the display panel 100 shown in FIG. 3 are substantially identical to one another. Therefore, for convenience of description, an ijth pixel PXij which is located on an ith horizontal line (or ith pixel row) and is connected to a jth data line Dj is illustrated in FIG. 4.

Referring to FIGS. 1 to 4, the ijth pixel PXij may include a light emitting unit EMU which generates light with a luminance corresponding to a data signal. Also, the ijth pixel PXij may selectively further include a pixel driving circuit PXC (or pixel circuit) for driving the light emitting unit EMU.

In an embodiment, the light emitting unit EMU may include at least one light emitting element LD connected in parallel between a first power line PL1 to which the voltage of the first driving power source VDD may be applied and a second power line PL2 to which the voltage of the second driving power source VSS may be applied. For example, the light emitting unit EMU may include a first electrode ELT1 (or first pixel electrode) electrically connected to the first driving power source VDD via the pixel driving circuit PXC and the first power line PL1, a second electrode ELT2 (or a second pixel electrode) electrically connected to the second driving power source VSS through the second power line PL2, and light emitting elements LD connected in parallel in the same direction between the first and second electrodes ELT1 and ELT2. In an embodiment, the first electrode ELT1 may be an anode electrode, and the second electrode ELT2 may be a cathode electrode.

In an embodiment, the light emitting element LD may be an inorganic light emitting element formed of an inorganic material. In an embodiment, the light emitting element LD may be an organic light emitting diode including an organic emitting layer. In an embodiment, the light emitting element LD may be a light emitting element made of a combination of an organic material and an inorganic material.

In an embodiment, each of the light emitting elements LD included in the light emitting unit EMU may include a first end portion connected to the first driving power source VDD through the first electrode ELT1 and a second end portion connected to the second driving power source VSS through the second electrode ELT2. The first driving power source VDD and the second driving power source VSS may have different potentials (or voltage levels). In an example, the first driving power source VDD may be set as a high-potential power source, and the second driving power source VSS may be set as a low-potential power source. A potential difference between the first and second driving power sources VDD and VSS may be set to be equal to or higher than a threshold voltage of the light emitting elements LD during an emission period of the ijth pixel PXij.

As described above, the light emitting elements LD connected in parallel in the same direction (for example, a forward direction) between the first electrode ELT1 and the second electrode ELT2, to which voltages having different potentials are supplied, may constitute effective light sources, respectively. The effective light sources may constitute the light emitting unit EMU of the ijth pixel PXij.

The light emitting elements LD of the light emitting unit EMU may emit light with a luminance corresponding to a driving current supplied from the corresponding pixel driving circuit PXC. For example, the pixel driving circuit PXC may supply a driving current corresponding to a grayscale value of corresponding frame data to the light emitting unit EMU during each frame period. The driving current supplied to the light emitting unit EMU may be divided to flow through the light emitting elements LD connected in the same direction. Accordingly, the light emitting unit EMU can emit light with the luminance corresponding to the driving current while each light emitting element LD emits light with a luminance corresponding to a current flowing therethrough.

The pixel driving circuit PXC may include first to seventh transistors T1 to T7 and a storage capacitor Cst.

A first electrode of the first transistor T1 (or driving transistor) may be connected (or electrically connected) to a first node N1, and a second electrode of the first transistor T1 may be connected to a second node N2. A gate electrode of the first transistor T1 may be connected to the third node N3. The first transistor T1 may control an amount of current flowing from the first driving power source VDD to the second driving power source VSS via the light emitting element LD, corresponding to a voltage of the third node N3 (or a data signal provided to the gate electrode from the jth data line Dj).

The second transistor T2 (or record transistor) may be connected between the jth data line Dj and the first node N1. A gate electrode of the second transistor T2 may be connected to the 4ith scan line S4*i*. The second transistor T2 may be turned on in case that the fourth scan signal is supplied to the 4ith scan line S4*i*, to electrically connect the jth data line Dj and the first node N1 to each other.

The third transistor T3 (or compensation transistor) may be connected between the second electrode of the first transistor T1 (for example, the second node N2) and the gate electrode of the first transistor T1 (for example, the third node N3). A gate electrode of the third transistor T3 may be connected to the 2ith scan line S2*i*. The third transistor T3 may be turned on in case that the second scan signal is supplied to the 2ith scan line S2*i*, to electrically connect the second electrode and the gate electrode of the first transistor T1 (for example, the second node N2 and the third node N3) to each other. For example, a timing at which the second electrode (for example, a drain electrode) of the first transistor T1 and the gate electrode of the first transistor T1 are connected to each other may be controlled by the second scan signal. In case that the third transistor T3 is turned on, the first transistor T1 may be connected in a diode form.

The fourth transistor T4 (or initialization transistor) may be connected between the third node N3 and the first initialization power source VINT1 (or a third power line PL3 to which the voltage of the first initialization power source VINT1 may be applied). A gate electrode of the fourth transistor T4 may be connected to the 3ith scan line S3*i*. The fourth transistor T4 may be turned on in case that the third scan signal is supplied to the 3ith scan line S3*i*, to supply the voltage of the first initialization power source VINT1 to the third node N3. A gate voltage of the first transistor T1 may be initialized to the voltage of the first initialization power source VINT1 by the turn-on of the fourth transistor T4. The pixels PX11 to PXnm may be commonly connected to the third power line PL3 to which the voltage of the first initialization power source VINT1 may be applied.

The fifth transistor T5 (or first light emitting transistor) may be connected between the first driving power source VDD and the first node N1. A gate electrode of the fifth transistor T5 may be connected an ith emission control line Ei. The fifth transistor T5 may be turned off in case that the emission control signal is supplied to the ith emission control line Ei, and be turned on in other cases.

The sixth transistor T6 (or second light emitting transistor) may be connected between the second electrode of the first transistor T1 (for example, the second node N2) and the first electrode ELT1 of the light emitting unit EMU (for example, a fourth node N4). A gate electrode of the sixth transistor T6 may be connected to the ith emission control line Ei. The sixth transistor T6 may be operated substantially identically to the fifth transistor T5.

Although a case where the fifth transistor T5 and the sixth transistor T6 are connected to the same ith emission control line Ei is illustrated in FIG. 3, this is merely illustrative, and the fifth transistor T5 and the sixth transistor T6 may be respectively connected to emission control lines to which different emission control signals are supplied.

The seventh transistor T7 (switching transistor or bypass transistor) may be connected between the first electrode ELT1 of the light emitting unit EMU (for example, the fourth node N4) and a jth sub-power line PL_Tj. A gate electrode of the seventh transistor T7 may be connected to the 1ith scan line S1*i*. The seventh transistor T7 may be turned on in case that the first scan signal is supplied to the 1ith scan line S1*i*, to connect the first electrode ELT1 of the light emitting unit EMU and the jth sub-power line PL_Tj to each other.

In an embodiment, a kth test signal V_AINTk or the voltage of the second initialization power source VINT2 may be applied to the jth sub-power line PL_Tj (k is a positive integer). The kth test signal V_AINTk may be one of the test signals V_AINT1 to V_AINT3 described with reference to FIG. 3.

For example, in the first mode, the voltage of the second initialization power source VINT2 may be applied to the jth sub-power line PL_Tj. The voltage of the second initialization power source VINT2 may be supplied to the first electrode ELT1 of the light emitting unit EMU, and a parasitic capacitor of the light emitting element LD may be discharged. As a remaining voltage charged in the parasitic capacitor is discharged (removed), unintended fine light emission can be prevented. Thus, the black expression ability of the pixel PX can be improved. The voltage of the second initialization power source VINT2 may be set to be lower than a value obtained by adding up the threshold voltage of the light emitting element LD and the second driving power source VSS. However, this is merely illustrative, and the voltage of the first initialization power source VINT1 and the voltage of the second initialization power source VINT2 may be variously set. In an example, the voltage of the first initialization power source VINT1 and the voltage of the second initialization power source VINT2 may be substantially equal to each other.

For example, in the second mode, the kth test signal V_AINTk may be applied to the jth sub-power line PL_Tj. In case that the seventh transistor T7 is turned on and in case that a voltage level of the kth test signal V_AINTk is higher than the threshold voltage of the light emitting element LD, a current flowing path may be formed, which passes through the jth sub-power line PL_Tj, the seventh transistor T7, the light emitting unit EMU, and the second power line PL2. The light emitting unit EMU (or light emitting element LD) may emit light and/or may not emit light in response to the kth test signal V_AINTk, and whether the ijth pixel PXij normally emits light or a characteristic of the ijth pixel PXij may be checked based on an emission state and/or a non-emission state of the light emitting unit EMU. For example, whether the light emitting unit EMU (or light emitting element LD) normally emits light or whether the light emitting element LD in the light emitting unit EMU has been normally bonded to the first electrode ELT1 may be checked based on a change in current flowing into the light emitting unit EMU through the seventh transistor T7 from the jth sub-power line PL_Tj.

The storage capacitor Cst may be formed or connected between the first driving power source VDD and the third node N3. The storage capacitor Cst may store a voltage applied to the third node N3.

The first transistor T1, the second transistor T2, the fifth transistor T5, the sixth transistor T6, and the seventh transistor T7 may be implemented with a poly-silicon semiconductor transistor. For example, the first transistor T1, the second transistor T2, the fifth transistor T5, the sixth transistor T6, and the seventh transistor T7 may include, as an active layer (e.g., a channel region), a poly-silicon semiconductor layer formed through a low temperature poly-silicon (LTPS) process. Also, the first transistor T1, the second transistor T2, the fifth transistor T5, the sixth transistor T6, and the seventh transistor T7 may be implemented with a P-type transistor (for example, a PMOS transistor). Accordingly, a gate-on voltage at which the first transistor T1, the second transistor T2, the fifth transistor T5, the sixth transistor T6, and the seventh transistor T7 are turned on may have a logic low level. Since the poly-silicon semiconductor transistor has a fast response speed, the poly-silicon semiconductor transistor may be applied to a switching element which requires fast switching.

The third transistor T3 and the fourth transistor T4 may be implemented with an oxide semiconductor transistor. For example, the third transistor T3 and the fourth transistor T4 may be implemented with an N-type oxide semiconductor transistor (for example, an NMOS transistor), and include an oxide semiconductor layer as an active layer. Accordingly, a gate-on voltage at which the third transistor T3 and the fourth transistor T4 are turned on may have a logic high level. The oxide semiconductor transistor can be formed through a low temperature process, and have a charge mobility lower than that of a poly-silicon semiconductor transistor. For example, the oxide semiconductor transistor has an excellent off-current characteristic. Thus, in case that the third transistor T3 and the fourth transistor T4 are implemented with the oxide semiconductor transistor, leakage current according to the low frequency driving can be minimized, and accordingly, display quality can be improved.

However, the first to seventh transistors T1 to T7 are not limited thereto. At least one of the first transistor T1, the second transistor T2, the fifth transistor T5, the sixth transistor T6, and the seventh transistor T7 may be implemented with the oxide semiconductor transistor, or at least one of the third transistor T3 and the fourth transistor T4 may be implemented with the poly-silicon semiconductor transistor.

Figure 5:
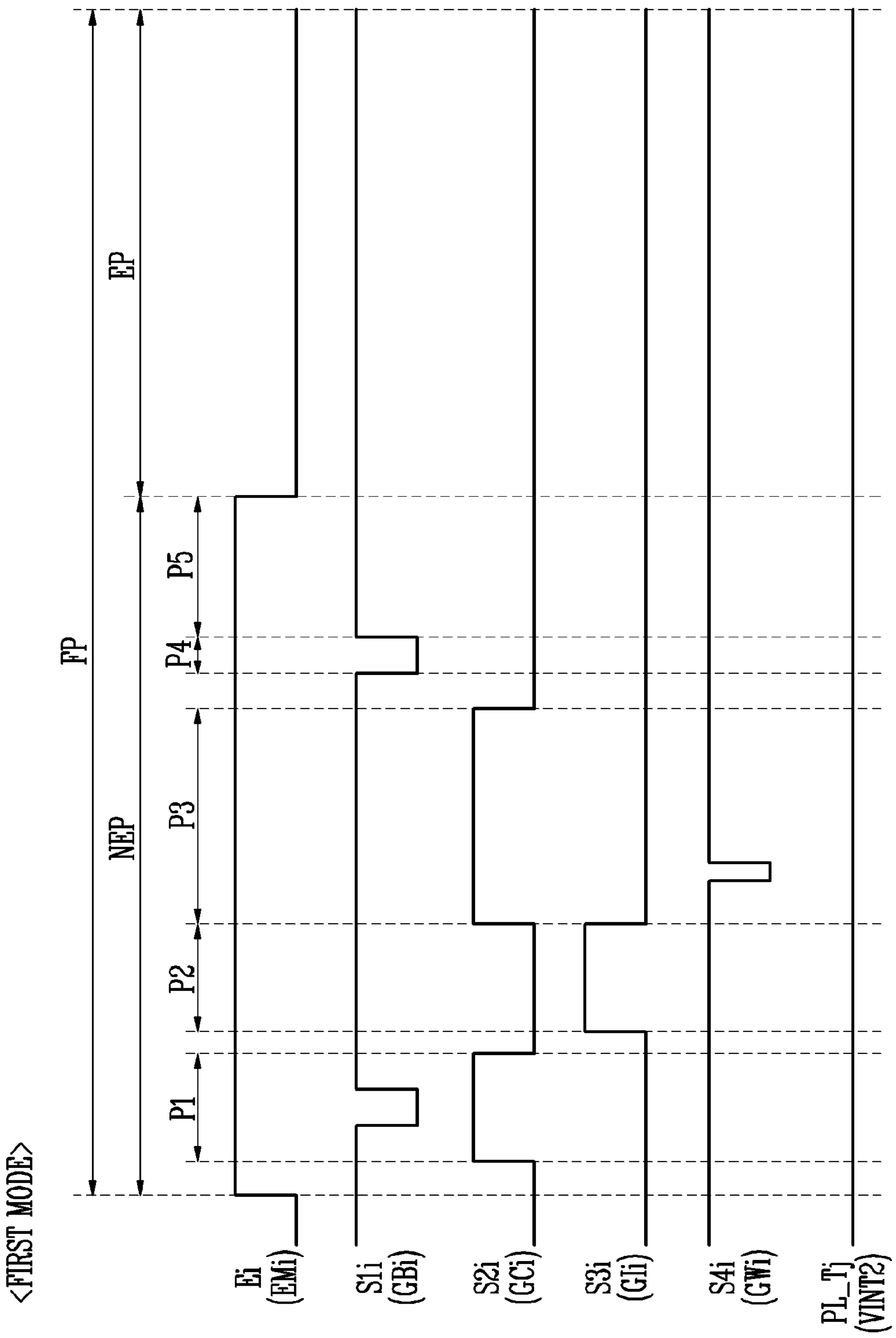
FIG. 5 is a timing diagram illustrating an example of signals supplied to the pixel shown in FIG. 4 in a first mode.

FIG. 5 is a timing diagram illustrating an example of signals supplied to the pixel shown in FIG. 4 in the first mode. In FIG. 5, signals supplied to the pixel shown in FIG. 4 during one frame period are illustrated.

Referring to FIGS. 1 to 5, in variable frequency driving in which a frame frequency is controlled, one frame period FP (or frame) may include a non-emission period NEP and an emission period EP. A period in which an emission control signal (i.e., the ith emission control signal Emi) has a logic low level may be the emission period EP, and a period except the emission period EP may be the non-emission period NEP. The non-emission period NEP may include a period in which a data signal corresponding to an output image is written to the ijth pixel PXij (or the pixels PX11 to PXnm) (see FIG. 3).

A first scan signal GBi may be a signal for initializing the light emitting element LD. For example, in case that the seventh transistor T7 is turned on by the first scan signal GBi, the voltage of the second initialization power source VINT2 may be supplied to the fourth node N4.

In the display device 1000 (see FIG. 1) in accordance with embodiments, the voltage of the second initialization power source VINT2 may be periodically applied to the first electrode ELT1 (or anode electrode) of the light emitting unit EMU by using the seventh transistor T7. In case that the voltage of the second initialization power source VINT2 may be applied to the first electrode ELT1 of the light emitting unit EMU, a remaining voltage charged in the parasitic capacitor of the light emitting element LD is discharged (removed), unintended fine light emission can be prevented.

A gate-on voltage of a second scan signal GCi and a third scan signal GIi, which are respectively supplied to the third transistor T3 and the fourth transistor T4 as N-type transistors, may have a logic high level. A gate-on voltage of a fourth scan signal GWi and the first scan signal GBi, which are respectively supplied to the second transistor T2 and the seventh transistor T7 as P-type transistors, may have the logic low level. The first to fourth scan signals GBi, GCi, GIi, and GWi may be respectively supplied from the first to fourth scan drivers 220, 240, 260, and 280 shown in FIG. 2.

The ith emission control signal EMi may be supplied to the ith emission control line Ei during the non-emission period NEP. Accordingly, the fifth transistor T5 and the sixth transistor T6 may be turned off during the non-emission period NEP. The non-emission period NEP may include first to fifth periods P1 to P5.

In the first period P1, the scan driver 200 may supply the second scan signal GCi to the 2ith scan line S2*i*, and supply the first scan signal GBi to the 1ith scan line S1*i*. The seventh transistor T7 may be turned on in response to the first scan signal GBi, and the parasitic capacitor of the light emitting element LD may be discharged by the voltage of the second initialization power source VINT2, which may be applied to the jth sub-power line PL_Tj.

In an embodiment, the first scan signal GBi may be supplied after the second scan signal GCi is supplied, but the disclosure is not limited thereto. For example, the second scan signal GCi the first scan signal GBi may be simultaneously supplied. In an embodiment, the supply of the second scan signal GCi and the first scan signal GBi may be omitted.

Subsequently, in the second period P2, the scan driver 200 may supply the third scan signal GIi to the 3ith scan line S3*i*. The fourth transistor T4 may be turned on by the third scan signal GIi. In case that the fourth transistor T4 is turned on, the voltage of the first initialization power source VINT1 may be supplied to the gate electrode of the first transistor T1. In the second period P2, the gate voltage of the first transistor T1 may be initialized based on the voltage of the first initialization power source VINT1.

Subsequently, in the third period P3, the scan driver 200 may supply the second scan signal GCi to the 2ith scan line S2*i*. The third transistor T3 may be again turned on in response to the second scan signal GCi. In the third period P3, the scan driver 200 may supply the fourth scan signal GWi to the 4i scan line S4*i* while overlapping a portion of the second scan signal GCi. The second transistor T2 may be turned on by the fourth scan signal GWi, and the data signal may be provided to the first node N1.

The first transistor T1 may be connected in the diode form by the turned-on third transistor T3, and data signal writing and threshold voltage compensation may be performed. Since the supply of the second scan signal GCi is maintained even after the supply of the fourth scan signal GWi is suspended, a threshold voltage of the first transistor T1 may be compensated for a sufficient time.

Subsequently, in the fourth period P4, the scan driver 200 may again supply the first scan signal GBi to the 1ith scan line S1*i*. Therefore, the seventh transistor T7 may be turned on. A voltage difference between the gate voltage and a source voltage (and a drain voltage) of the first transistor T1 may increase due to the threshold voltage compensation in the third period P3. A characteristic of the first transistor T1 may be changed, and a driving current in the emission period EP may be increased or excitation of black grayscale may be viewed. In order to prevent the change in characteristic, the seventh transistor T7 may be turned on in the fourth period P4.

The fifth period P5 may be inserted as long as the first to fourth scan signals GBi, GCi, GIi, and GWi are not supplied between the fourth period P4 and the emission period EP.

Figure 6:
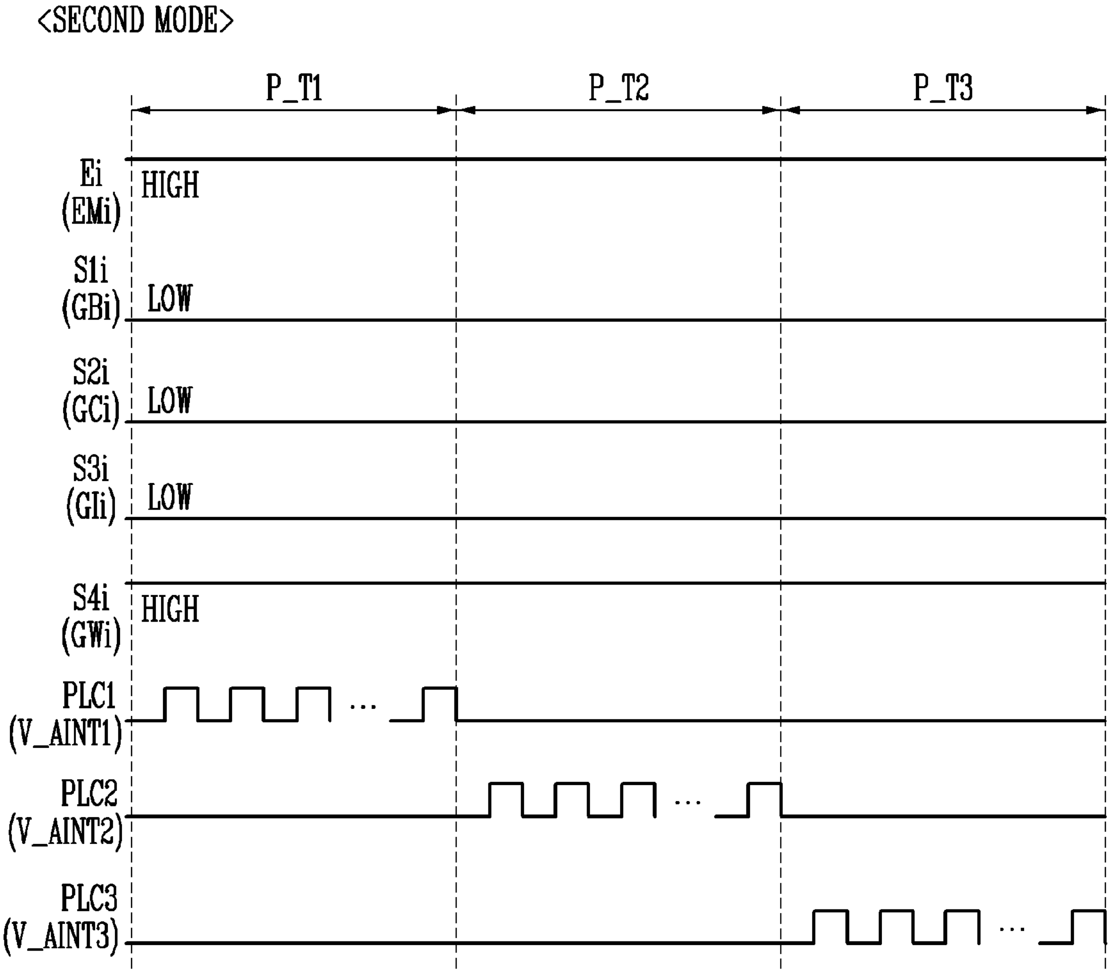
FIG. 6 is a timing diagram illustrating an example of signals supplied to the pixel shown in FIG. 4 in a second mode.
Figure 7:
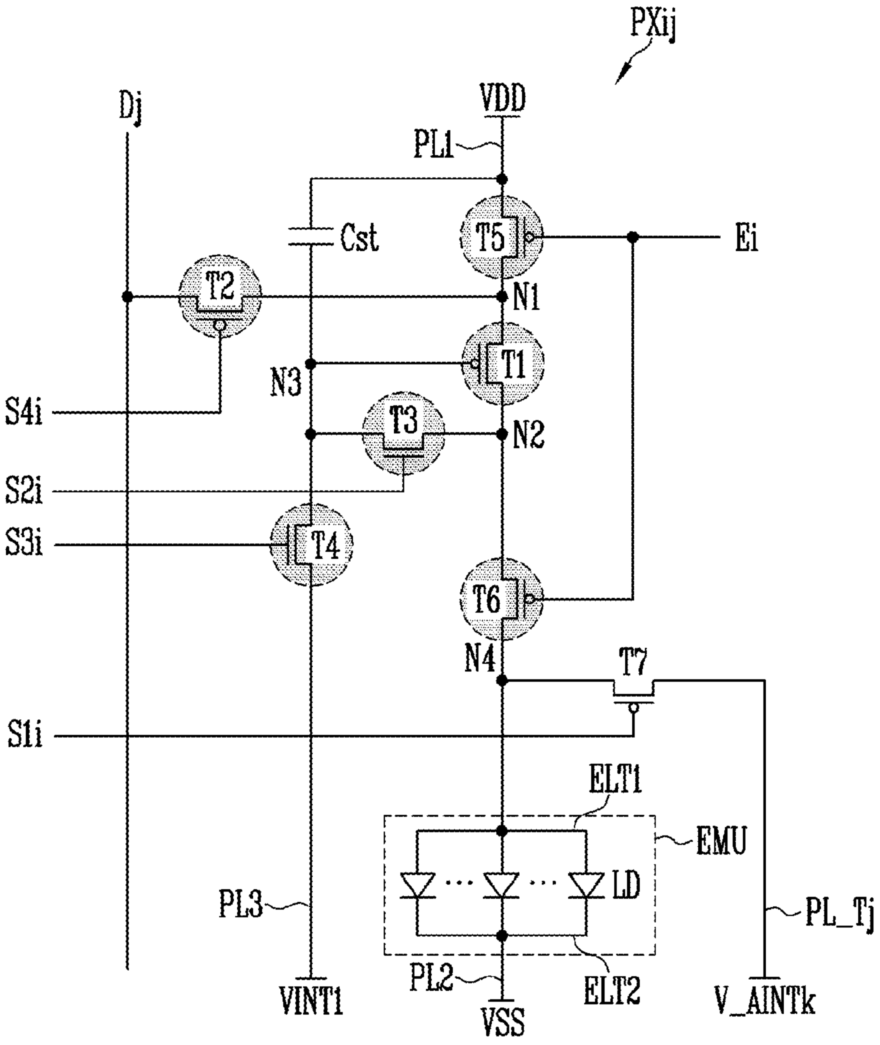
FIG. 7 is a schematic circuit diagram illustrating a state of the pixel shown in FIG. 4 in the second mode.

FIG. 6 is a timing diagram illustrating an example of signals supplied to the pixel shown in FIG. 4 in the second mode. FIG. 7 is a schematic circuit diagram illustrating a state of the pixel shown in FIG. 4 in the second mode.

Referring to FIGS. 1 to 7, in the second mode, the scan driver 200 may supply an ith emission control signal EMi (for example, the ith emission control signal EMi having a logic high level HIGH) to the ith emission control line Ei. The fifth transistor T5 and the sixth transistor T6 may be turned off in response to the ith emission control signal EMi having the logic high level HIGH.

Also, in the second mode, the scan driver 200 may supply the second scan signal GCi having a logic low level LOW to the 2ith scan line S2*i*, supply the third scan signal GIi having the logic low level LOW to the 3ith scan line S3*i*, and supply the fourth scan signal GWi having the logic high level HIGH to the 4ith scan line S4*i*. The third transistor T3 may be turned off in response to the second scan signal GCi having the logic low level LOW, the fourth transistor T4 may be turned off in response to the third scan signal GIi having the logic low level LOW, and the second transistor T2 may be turned off in response to the fourth scan signal GWi having the logic high level HIGH. In case that the second transistor T2 and the third transistor T3 are turned off, any data signal is not applied to the gate electrode of the first transistor T1, and the first transistor T1 may maintain a turn-off state.

In the second mode, the scan driver 200 may supply the first scan signal GBi (for example, the first scan signal GBi having the logic low level LOW) to the 1ith scan line S1*i*. The seventh transistor T7 may be turned on in response to the first scan signal GBi having the logic low level LOW. The first scan start signal FLM1 (see FIG. 2) provided to the first scan driver 220 shown in FIG. 2 may have the logic low level LOW in the second mode such that the scan driver 200 outputs the first scan signal GBi having the logic low level LOW in the second mode.

For example, in the second mode, only the seventh transistor T7 may be turned on, and the first to sixth transistor T1 to T6 may be turned off or maintain the turn-off state.

According to the turn-on state of the seventh transistor T7, in the second mode, the first electrode ELT1 of the light emitting unit EMU and the jth sub-power line PL_Tj may be connected to each other, the kth test signal V_AINTk may be applied to the first electrode of the light emitting unit EMU, the light emitting unit EMU may emit light or may not emit light according to the voltage level of the kth test signal V_AINTk, and it may be checked whether the light emitting unit EMU is normal (or whether the light emitting element LD in the light emitting unit EMU has been normally bonded to the first electrode ELT1). For example, a lighting test on the light emitting unit EMU (or the light emitting element LD) can be performed by using only one transistor, for example, the seventh transistor T7 in the pixel driving circuit PXC.

In an embodiment, the power supply 500 may provide the first test signal V_AINT1 having a square wave form to the first common power line PLC1 in a first test period P_T1, provide the second test signal V_AINT2 having the square wave form to the second common power line PLC2 in a second test period P_T2, and provide the third test signal V_AINT3 having the square wave form to the third common power line PLC3 in a third test period P_T3.

Since the first test signal V_AINT1 having the square wave form is applied to only the first common power line PLC1 in the first test period P_T1, only the first color pixels (for example, the eleventh to nith pixels PX11 to PXn1 and the (1m−2)th to (nm−2)th pixels PX1*m*−2 to PXnm−2, which are shown in FIG. 3) connected to the first common power line PLC1 may emit light. For example, a lighting test on the first color pixels may be performed in the first test period P_T1.

Similarly, since the second test signal V_AINT2 having the square wave form is applied to only the second common power line PLC2 in the second test period P_T2, only the second color pixels (for example, the twelfth to n2th pixels PX12 to PXn2 and the (1m−1)th to (nm−1)th pixels PX1*m*−1 to PXnm−1, which are shown in FIG. 3) connected to the second common power line PLC2 may emit light. For example, a lighting test on the second color pixels may be performed in the second test period P_T2.

Since the third test signal V_AINT3 having the square wave form is applied to only the third common power line PLC3 in the third test period P_T3, only the third color pixels (for example, the thirteenth to n3th pixels PX13 to PXn3 and the lmth to nmth pixels PX1*m* to PXnm, which are shown in FIG. 3) connected to the third common power line PLC3 may emit light. For example, a lighting test on the third color pixels may be performed in the third test period P_T3.

Pixels emitting light of the same color among the pixels PX11 to PXnm (see FIG. 3) have a similar characteristic. Hence, in case that a lighting test is performed on grouped pixels emitting light with similar color (or having a similar characteristic), whether the corresponding pixels normally emit light and/or the characteristic of the corresponding pixels can be more readily checked.

As described above, a lighting test on the light emitting unit EMU (or the light emitting element LD) can be performed by using only one transistor, for example, the seventh transistor T7 in the pixel driving circuit PXC. For example, a process for the lighting test can be simplified.

Further, pixels emitting light of the same color can be grouped, and a lighting test can be sequentially performed for each group. Accordingly, whether the pixels normally emit light (or whether the light emitting element LD in the light emitting unit EMU has been normally bonded to the first electrode ELT1) and/or a characteristic of the pixels can be more readily checked.

Figure 8A:
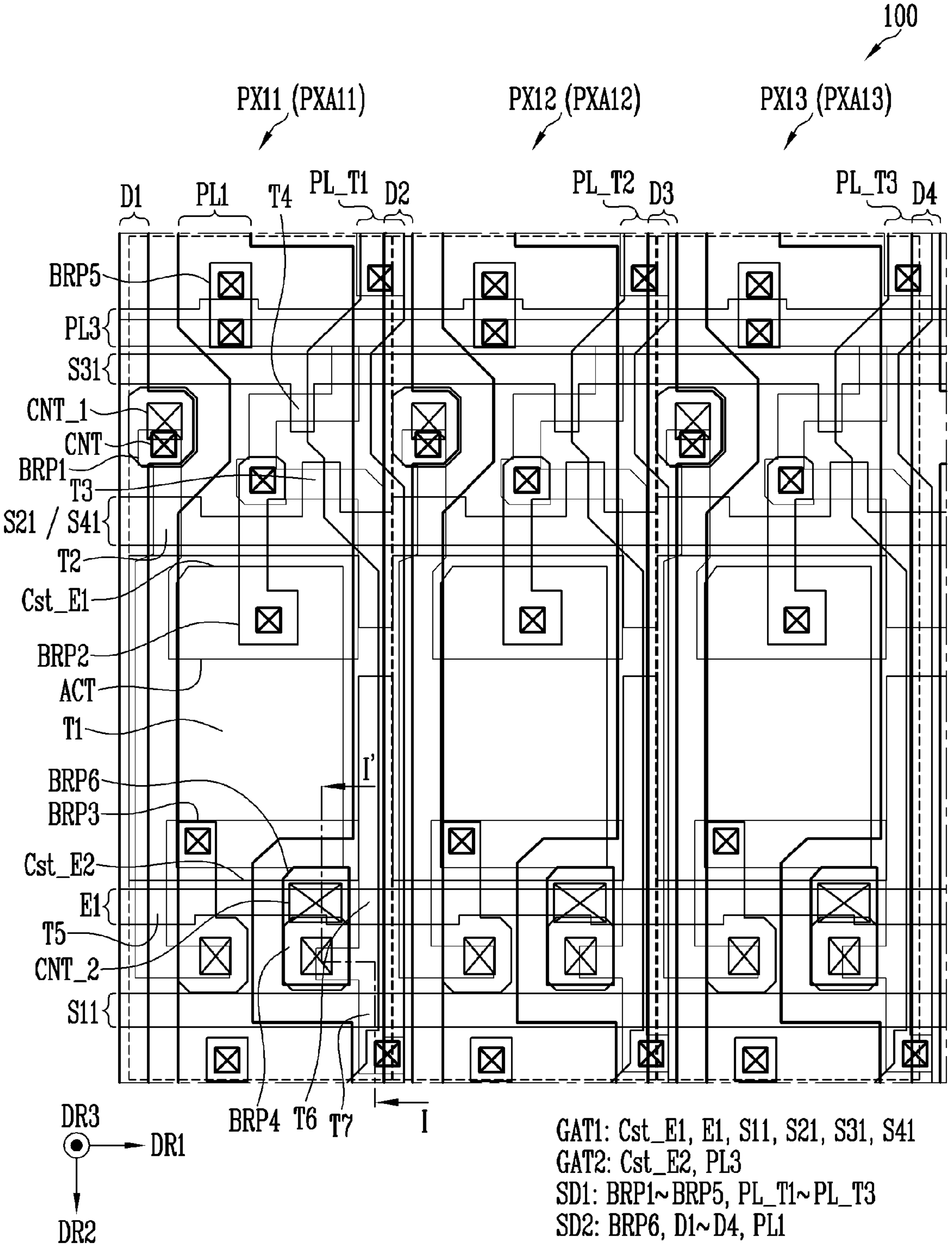
FIG. 8A is a view schematically illustrating pixels included in the display panel shown in FIG. 3, and is a schematic plan view of the pixels viewed from the top, based on a pixel driving circuit shown in FIG. 4.
Figure 8B:
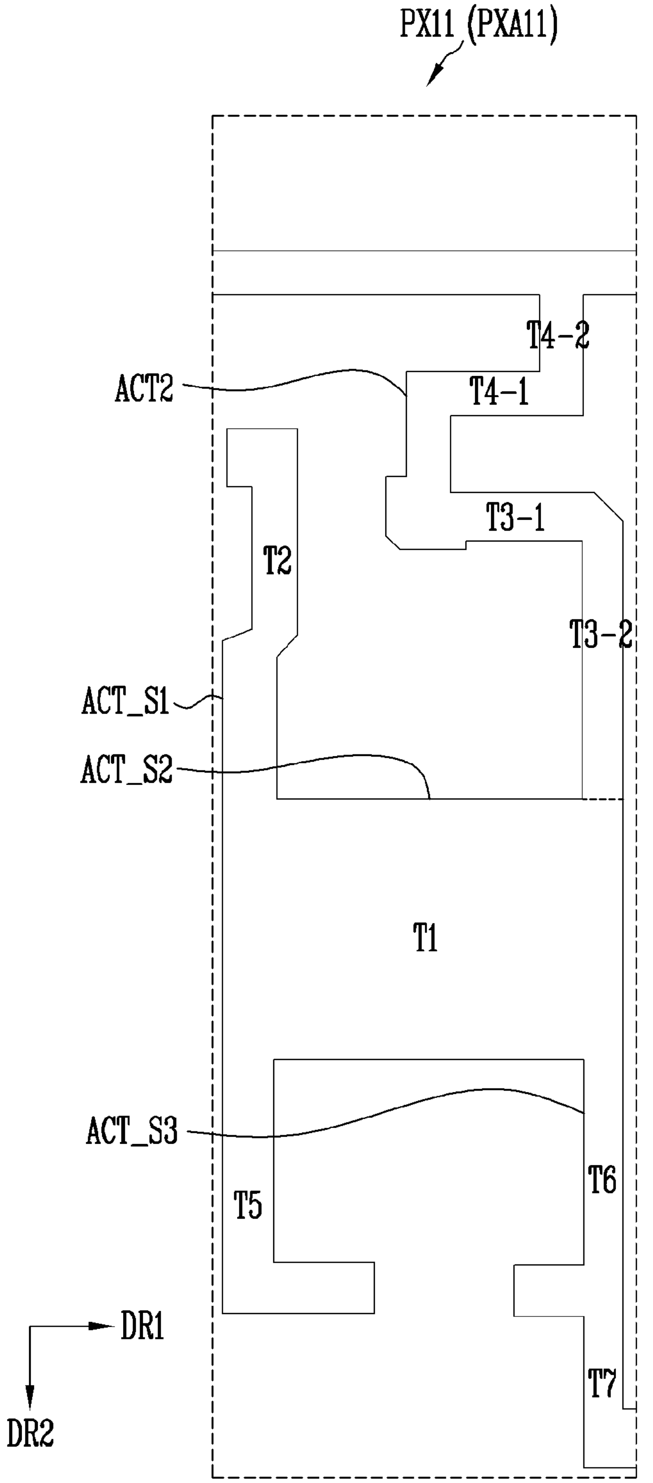
FIG. 8B is a schematic plan view illustrating an example of a semiconductor layer included in an eleventh pixel shown in FIG. 8A.

FIG. 8A is a view schematically illustrating the pixels included in the display panel shown in FIG. 3, and is a schematic plan view of the pixels viewed from the top, based on the pixel driving circuit shown in FIG. 4. Since the pixels PX11 to PXnm shown in FIG. 3 are substantially identical to one another, the eleventh to thirteenth pixels PX11 to PX13 shown in FIG. 3 are illustrated in FIG. 8A for convenience of description. FIG. 8B is a plan view illustrating an example of a semiconductor layer included in the eleventh pixel shown in FIG. 8A.

Referring to FIGS. 3, 4, 8A, and 8B, the display panel 100 may include the eleventh pixel PX11 (or an eleventh pixel area PXA11), the twelfth pixel PX12 (or a twelfth pixel area PXA12), and the thirteenth pixel PX13 (or a thirteenth pixel area PXA13). The eleventh pixel PX11, the twelfth pixel PX12, and the thirteenth pixel PX13 may constitute one unit pixel.

In an embodiment, the eleventh to thirteenth pixels PX11 to PX13 may emit lights of different colors. In an example, the eleventh pixel PX11 may be a red pixel emitting light of red, the twelfth pixel PX12 may be a green pixel emitting light of green, and the thirteenth pixel PX13 may be a blue pixel emitting light of blue. However, the color, kind, and/or number of pixels constituting the unit pixel are not particularly limited. In an example, the color of light emitted from each pixel may be variously changed. In an embodiment, the eleventh to thirteenth pixels PX11 to PX13 may emit light of the same color. For example, each of the eleventh to thirteenth pixels PX11 to PX13 may be a blue pixel emitting light of blue.

The eleventh to thirteenth pixels PX11 to PX13 (or pixel driving circuits of the eleventh to thirteenth pixels PX11 to PX13) are substantially identical or similar to one another. Therefore, hereinafter, the eleventh pixel PX11 will be described, including the eleventh to thirteenth pixels PX11 to PX13.

The eleventh pixel PX11 may include a semiconductor layer ACT, a first conductive layer GAT1, a second conductive layer GAT2, a third conductive layer SD1, and a fourth conductive layer SD2. The semiconductor layer ACT, the first conductive layer GAT1, the second conductive layer GAT2, the third conductive layer SD1, and the fourth conductive layer SD2 may be formed in different layers through different processes.

The semiconductor layer ACT may be an active layer forming a channel region of first to seventh transistors T1 to T7. The semiconductor layer ACT may include a source region and a drain region, which are in contact with a first transistor electrode (for example, a source electrode) and a second transistor electrode (for example, a drain electrode) of each of the first to seventh transistors T1 to T7. A region between the source region and the drain region may be a channel region. The channel region of the semiconductor layer ACT may be a semiconductor pattern undoped with an impurity, and may be an intrinsic semiconductor. Each of the source region and the drain region may be a semiconductor pattern doped with the impurity.

As shown in FIG. 8B, the semiconductor layer ACT may include a first semiconductor pattern ACT1 and a second semiconductor pattern ACT2.

In an embodiment, the first semiconductor pattern ACT1 may include a silicon semiconductor (or poly-silicon semiconductor), and the second semiconductor pattern ACT2 may include an oxide semiconductor.

The first semiconductor pattern ACT1 may include a first longitudinal part ACT_S1 (or first sub-semiconductor pattern), a lateral part ACT_S2 (or second sub-semiconductor pattern), and a second longitudinal part ACT_S3 (or third sub-semiconductor pattern). The first longitudinal part ACT_S1, the lateral part ACT_S2, and the second longitudinal part ACT_S3 may be connected to each other and may be integral with each other.

The first longitudinal part ACT_S1 may extend in the second direction DR2, and be located adjacent to one side or a side of the eleventh pixel area PXA11. The first longitudinal part ACT_S1 may constitute a channel region of the second transistor T2 and a channel region of the fifth transistor T5. With respect to the lateral part ACT_S2, an upper side portion of the first longitudinal part ACT_S1 may constitute the channel region of the second transistor T2, and a lower side portion of the first longitudinal part ACT_S1 may constitute the channel region of the fifth transistor T5.

The lateral part ACT_S2 may extend in the first direction DR1 from a central portion of the first longitudinal part ACT_S1. The lateral part ACT_S2 may constitute a channel region of the first transistor T1. In an embodiment, the lateral part ACT_S2 may have a bent shape. The channel capacity of the first transistor T1 may be improved by the bent shape. It is to be understood that the shapes disclosed herein may include shapes substantially identical or similar to the shapes.

The second longitudinal part ACT_S3 may extend in the second direction DR2, and be located adjacent to the other side of the eleventh pixel area PXA11. With respect to the lateral part ACT_S2, a lower side portion of the second longitudinal part ACT_S3 may constitute a channel region of the sixth transistor T6 and a channel region of the seventh transistor T7.

The second semiconductor pattern ACT2 may be located at an upper side of the second longitudinal part ACT_S3 with respect to the lateral part ACT_S2. The second semiconductor pattern ACT2 may constitute a channel region of the third transistor T3 and a channel region of the fourth transistor T4.

In an embodiment, the third transistor T3 may include (3-1)th and (3-2)th transistors T3-1 and T3-2 (or first and second sub-transistors), and the second semiconductor pattern ACT2 may include channel regions of the (3-1)th and (3-2)th transistors T3-1 and T3-2, for example, two channel regions connected in series. Similarly, the fourth transistor T4 may include (4-1)th and (4-2)th transistors T4-1 and T4-2 (or third and fourth sub-transistors), and the second semiconductor pattern ACT2 may include channel regions of the (4-1)th and (4-2)th transistors T4-1 and T4-2, for example, two channel regions connected in series. The third transistor T3 and the fourth transistor T4, each of which is implemented with two transistors (or sub-transistors), can prevent leakage of a current (for example, a driving current flowing from the first transistor T1 to the sixth transistor T6).

Referring back to FIG. 8A, the first conductive layer GAT1 may include a first capacitor electrode Cst_E1, a first emission control line E1, an eleventh scan line S11, a twenty-first scan line S21, a thirty-first scan line S31, and a forty-first scan line S41.

The first capacitor electrode Cst_E1 may have a specific or given area, be roughly located at the center of the eleventh pixel area PXA11, and overlap the lateral part ACT_S2 of the first semiconductor pattern ACT1. The first capacitor electrode Cst_E1 may constitute a gate electrode of the first transistor T1.

The first emission control line E1 may extend in the first direction DR1, and be located at a lower side of the first capacitor electrode Cst_E1. The first emission control line E1 may overlap each of the first longitudinal part ACT_S1 and the second longitudinal part ACT_S3 of the first semiconductor pattern ACT1, and constitute or be connected to each of a gate electrode of the fifth transistor T5 and a gate electrode of the sixth transistor T6.

The eleventh scan line S11 may extend in the first direction DR1, and be located at a lowermost side of the eleventh pixel area PXA11. The eleventh scan line S11 may overlap the second longitudinal part ACT_S3 of the first semiconductor pattern ACT1, and constitute or be connected to a gate electrode of the seventh transistor T7.

The twenty-first scan line S21 may extend in the first direction DR1, and be located at an upper side of the first capacitor electrode Cst_E1. The twenty-first scan line S21 may overlap the second semiconductor pattern ACT2, and constitute or be connected to a gate electrode of the third transistor T3.

The thirty-first scan line S31 may extend in the first direction DR1, and be located adjacent to an uppermost side of the eleventh pixel area PXA11. The thirty-first scan line S31 may overlap the second semiconductor pattern ACT2, and constitute or be connected to a gate electrode of the fourth transistor T4.

The forty-first scan line S41 may extend in the first direction DR1, overlap the first longitudinal part ACT_S1 of the first semiconductor pattern ACT1, and constitute or be connected to a gate electrode of the second transistor T2.

The first conductive layer GAT1 may include at least one metal selected from molybdenum (Mo), aluminum (Al), platinum (Pt), palladium (Pd), silver (Ag), magnesium (Mg), gold (Au), nickel (Ni), neodymium (Nd), iridium (Ir), chromium (Cr), titanium (Ti), tantalum (Ta), tungsten (W), and copper (Cu). The first conductive layer GAT1 may have a single-layer or multi-layer structure. For example, the first conductive layer GAT1 may have a single-layer structure including molybdenum (Mo).

The second conductive layer GAT2 may include a second capacitor electrode Cst_E2 and a third power line PL3.

The third power line PL3 may extend in the first direction DR1, and be disposed at the uppermost side of the eleventh pixel area PXA11.

The second capacitor electrode Cst_E2 may overlap the first capacitor electrode Cst_E1. The second capacitor electrode Cst_E2 along with the first capacitor electrode Cst_E1 may constitute the storage capacitor Cst (see FIG. 4). An area of the second capacitor electrode Cst_E2 may be greater than that of the first capacitor electrode Cst_E1, and the second capacitor electrode Cst_E2 may cover or overlap the first capacitor electrode Cst_E1.

The second conductive layer GAT2 may include at least one metal selected from molybdenum (Mo), aluminum (Al), platinum (Pt), palladium (Pd), silver (Ag), magnesium (Mg), gold (Au), nickel (Ni), neodymium (Nd), iridium (Ir), chromium (Cr), titanium (Ti), tantalum (Ta), tungsten (W), and copper (Cu). The second conductive layer GAT2 may have a single-layer or multi-layer structure. For example, the second conductive layer GAT2 may have a single-layer structure including molybdenum (Mo).

The third conductive layer SD1 may include first to fifth bridge patterns BRP1 to BRP5 (or first to fifth connection patterns) and first to third sub-power lines PL_T1 to PL_T3.

The first bridge pattern BRP1 may overlap a first area of the second transistor T2, and be connected to the first area of the second transistor T2 through a contact hole CNT. Also, the first bridge pattern BRP1 may connect a first data line D1 and the first area of the second transistor T2 to each other.

The second bridge pattern BRP2 may overlap each of a portion of the second semiconductor pattern ACT2 and the first capacitor electrode Cst_E1. The second bridge pattern BRP2 may be connected to a portion of the second semiconductor pattern ACT2 through a contact hole exposing the portion of the second semiconductor pattern ACT2, and be connected to each of one electrode of the third transistor T3 and one electrode of the fourth transistor T4. Also, the second bridge pattern BRP2 may be connected to the first capacitor electrode Cst_E1 exposed by the second capacitor electrode Cst_E2.

The third bridge pattern BRP3 may overlap a first area of the fifth transistor T5, and be connected to the first area of the fifth transistor T5 through a contact hole. The third bridge pattern BRP3 may connect the first area of the fifth transistor T5 to a first power line PL1.

The fourth bridge pattern BRP4 may overlap a second area of the sixth transistor T6, and be connected to the second area of the sixth transistor T6 through a contact hole. The fourth bridge pattern BRP4 may connect the second area of the sixth transistor T6 to the first electrode ELT1 (see FIG. 9 or FIG. 4) through the sixth bridge pattern BRP6.

The fifth bridge pattern BRP5 may overlap the third power line PL3 and one end portion of the second semiconductor pattern ACT2. The fifth bridge pattern BRP5 may be connected to the third power line PL3 through a contact hole, and be connected to the one end portion of the second semiconductor pattern ACT2 (for example, a second electrode of the fourth transistor T4) through a contact hole. For example, the fifth bridge pattern BRP5 may connect the third power line PL3 and the second electrode of the fourth transistor T4 to each other.

The first sub-power line PL_T1 may extend in the second direction DR2, and be located at the other side of the eleventh pixel area PXA11 in the first direction DR1 (or an adjacent area between the eleventh pixel area PXA11 and the twelfth pixel area PXA12). The first sub-power line PL_T1 may overlap the seventh transistor T7, and be connected to one electrode of the seventh transistor T7 through a contact hole. The first sub-power line PL_T1 may include a bent part detouring around the first bridge pattern BRP1 (for example, a first bridge pattern BRP1 of the twelfth pixel PX12) to be spaced apart from the first bridge pattern BRP1.

Similar to the first sub-power line PL_T1, the second sub-power line PL_T2 may extend in the second direction DR2, and be located at the other side of the twelfth pixel area PXA12 in the first direction DR1. The third sub-power line PL_T3 may extend in the second direction DR2, and be located at the other side of the thirteenth pixel area PXA13 in the first direction DR1. The first to third sub-power lines PL_T1 to PL_T3 may be sequentially arranged along the first direction DR1.

The fourth conductive layer SD2 may include a sixth bridge pattern BRP6 (or sixth connection pattern), first to fourth data lines D1 to D4, and the first power line PL1.

The sixth bridge pattern BRP6 may overlap the fourth bridge pattern BRP4, and be connected to the fourth bridge pattern BRP4 through a contact hole. The sixth bridge pattern BRP6 may be connected to the second area of the sixth transistor T6 through the fourth bridge pattern BRP4. Also, the sixth bridge pattern BRP6 may be connected to the first electrode ELT1 (see FIG. 9 or FIG. 4) through a contact hole CNT_2. For example, the sixth bridge pattern BRP6 along with the fourth bridge pattern BRP4 may connect the second area of the sixth transistor T6 to the first electrode ELT1.

The first data line D1 may extend in the second direction DR2, be located at the one side of the eleventh pixel area PXA11 in the first direction DR1, and overlap the first bridge pattern BRP1. The first data line D1 may be connected to the first bridge pattern BRP1 through the contact hole CNT_1, and be connected to the first area of the second transistor T2 through the first bridge pattern BRP1.

Similar to the first data line D1, the second data line D2 may extend in the second direction DR2, and be located at the one side of the twelfth pixel area PXA12 in the first direction DR1 (or an adjacent area between the eleventh pixel area PXA11 and the twelfth pixel area PXA12). In an embodiment, the second data line D2 may overlap the first sub-power line PL_T1. The third data line D3 may extend in the second direction DR2, be located at the one side of the thirteenth pixel area PXA13 in the first direction DR1 (or an adjacent area between the twelfth pixel area PXA12 and the thirteenth pixel area PXA13), and overlap the second sub-power line PL_T2. The fourth data line D4 may extend in the second direction DR2, be located at the other side of the thirteenth pixel area PXA13 in the first direction DR1, and overlap the third sub-power line PL_T3. The first to fourth data lines D1 to D4 may be sequentially arranged along the first direction DR1.

The first power line PL1 may extend in the second direction DR2, and be located between the first data line D1 and the second data line D2. The first power line PL1 may cover or overlap a lower configuration (for example, the third transistor T3, the fourth transistor T4, and the first transistor T1) between the first data line D1 and the second data line D2.

The third conductive layer SD1 and the fourth conductive layer SD2 may include at least one metal selected from molybdenum (Mo), aluminum (Al), platinum (Pt), palladium (Pd), silver (Ag), magnesium (Mg), gold (Au), nickel (Ni), neodymium (Nd), iridium (Ir), chromium (Cr), titanium (Ti), tantalum (Ta), tungsten (W), and copper (Cu). The third conductive layer SD1 and the fourth conductive layer SD2 may have a single-layer or multi-layer structure. For example, the third conductive layer SD1 and the fourth conductive layer SD2 may have a multi-layer structure of Ti/Al/Ti.

Figure 9:
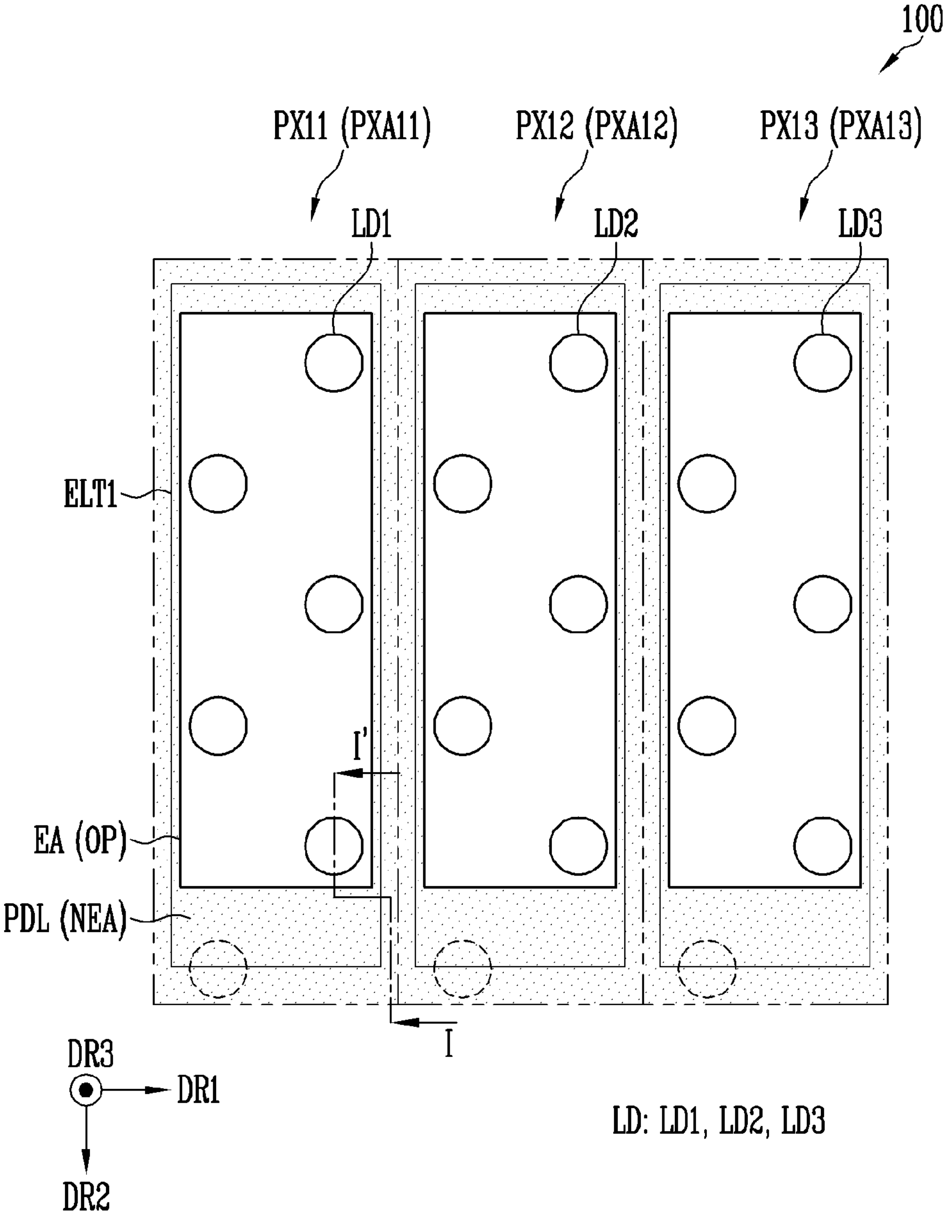
FIG. 9 is a view schematically illustrating pixels included in the display panel shown in FIG. 3, and is a schematic plan view of the pixels viewed from the top, based on a light emitting unit shown in FIG. 4.

FIG. 9 is a view schematically illustrating the pixels included in the display panel shown in FIG. 3, and is a schematic plan view of the pixels viewed from the top, based on the light emitting unit shown in FIG. 4. In FIG. 9, the eleventh to thirteenth pixels PX11 to PX13 shown in FIG. 3 are illustrated corresponding to FIG. 8A.

Referring to FIGS. 3, 4, 8A, and 9, the eleventh to thirteenth pixels PX11 to PX13 (or light emitting units of the eleventh to thirteenth pixels PX11 to PX13) are substantially identical or similar to one another. Therefore, hereinafter, the eleventh pixel PX11 will be described, including the eleventh to thirteenth pixels PX11 to PX13.

The eleventh pixel PX11 may include a first electrode ELT1, a pixel defining layer PDL (or bank), and light emitting elements LD.

The first electrode ELT1 may be located in an emission area EA of the eleventh pixel area PXA11. The first electrode ELT1 may be connected to the sixth bridge pattern BRP6 through the contact hole CNT_2 (see FIG. 8A), and be connected to the second area of the sixth transistor T6 through the sixth bridge pattern BRP6 and the fourth bridge pattern BRP4.

The first electrode ELT1 may extend from the emission area EA to a non-emission area NEA. The first electrode ELT1 may be spaced apart from a first electrode ELT1 of another pixel.

The first electrode ELT1 may guide light emitted from the light emitting elements LD in a third direction DR3. To this end, the first electrode ELT1 may be made of a conductive material (or substance) having a constant reflexibility. The conductive material (or substance) may include an opaque metal. The opaque metal may include, for example, a metal such silver (Ag), magnesium (Mg), aluminum (Al), platinum (Pt), palladium (Pd), gold (Au), neodymium (Nd), iridium (Ir), chromium (Cr), titanium (Ti), molybdenum (Mo), or any alloy thereof.

In an embodiment, the first electrode ELT1 may have a multi-layered structure including electrode layers. The first electrode ELT1 may include a first electrode layer and a second electrode layer, which may be sequentially stacked each other in the third direction DR3. One of the first electrode layer and the second electrode layer may have a relatively high electrical conductivity (or conductivity), and the other of the first electrode layer and the second electrode layer may have a relatively high reflexibility. For example, the first electrode layer may be made of a low-resistance material to decrease resistance (or contact resistance), and the second electrode layer may include a material having a constant reflexibility to allow light emitted from the light emitting elements LD to advance in the third direction DR3. For example, the first electrode layer may include metals such as molybdenum (Mo), titanium (Ti), copper (Cu), aluminum (Al), silver (Ag), and alloys thereof, and may include a metal (for example, molybdenum (Mo)) having an electrical conductivity higher than that of the second electrode layer. For example, the second electrode layer may include metals such as silver (Ag), magnesium (Mg), aluminum (Al), platinum (Pt), palladium (Pd), gold (Au), nickel (Ni), neodymium (Nd), iridium (Ir), chromium (Cr), titanium (Ti), and alloys thereof, and may include a metal (for example, aluminum (Al)) having a reflexibility higher than that of the first electrode layer.

In an embodiment, the first electrode ELT1 may include a transparent conductive material (or substance). The transparent conductive material (or substance) may include a conductive oxide such as indium tin oxide (ITO), indium zinc oxide (IZO), zinc oxide (ZnO), indium gallium zinc oxide (IGZO), or indium tin zinc oxide (ITZO), a conductive polymer such as poly(3,4-ethylenedioxythiophene) PEDOT, and the like within the spirit and the scope of the disclosure.

The pixel defining layer PDL may be located in the non-emission area NEA of the eleventh pixel area PXA11. The pixel defining layer PDL may partially overlap an edge of the first electrode ELT1, but the disclosure is not limited thereto. The pixel defining layer PDL may be formed between pixels PX (see FIG. 1) while surrounding the emission area EA, to define or partition an emission area EA of each pixel. The emission area EA may correspond to an opening OP of the pixel defining layer PDL. In a process of disposing light emitting elements LD, the pixel defining layer PDL may prevent the light emitting elements LD (for example, a light emitting element LD indicated by a dotted line) from being disposed in the non-emission area NEA. Also, the pixel defining layer PDL may prevent a failure (for example, a short circuit) occurring in case that the light emitting elements LD are connected to the first electrode ELT1 and another component in the non-emission area NEA.

The pixel defining layer PDL may include an insulating material including an inorganic material and/or an organic material. In an example, the pixel defining layer PDL may include at least one inorganic layer including various inorganic insulating materials, including silicon nitride ($SiN_x$), silicon oxide ($SiO_x$), or the like within the spirit and the scope of the disclosure. For example, the pixel defining layer PDL may include at least one organic layer including various organic insulating materials currently know in the art and/or a photoresist layer, or be a single- or multi-layered insulator including a combination of organic or inorganic materials. For example, the material constituting the pixel defining layer PDL may be variously changed.

In an embodiment, the pixel defining layer PDL may include at least one light blocking material and/or at least one reflective material, to prevent a light leakage defect in which light (or beam) is leaked between pixels. In an embodiment, the pixel defining layer PDL may include a transparent material (or substance). The transparent material may include, for example, polyamides resin, polyimides resin, etc., but the disclosure is not limited thereto. In other embodiments, a reflective material layer may be separately provided and/or formed on the pixel defining layer PDL so as to further improve the efficiency of light emitted from each pixel.

The light emitting elements LD may be provided in the emission area EA. The light emitting elements LD may be spaced apart from each other at the same distance on the first electrode ELT1. First light emitting elements LD1 may be provided in the emission area EA of the eleventh pixel PX11, second light emitting elements LD2 may be provided in an emission area EA of the twelfth pixel PX12, and third light emitting elements LD3 may be provided in an emission area EA of the thirteenth pixel PX13.

Figure 10:
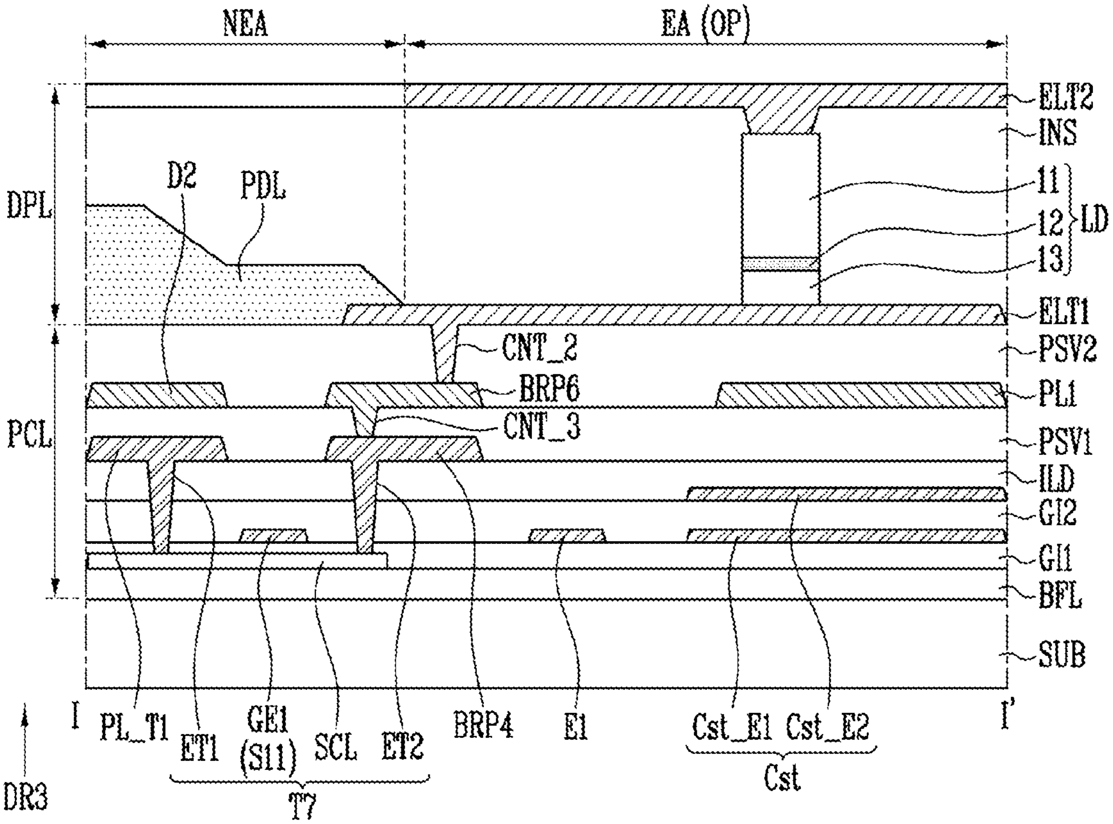
FIG. 10 is a sectional view illustrating an embodiment of the pixel taken along line I-I' shown in FIGS. 8A and 9.

FIG. 10 is a sectional view illustrating an embodiment of the pixel taken along line I-I' shown in FIGS. 8A and 9.

In FIG. 10, the one pixel is simplified and illustrated, such as a case where each electrode is illustrated as only a single-layered electrode and a case where each of insulating layers is illustrated as only a single-layered insulating layer. However, the disclosure is not limited thereto.

In an embodiment, as long as any other description is not provided, the term "being formed and/or provided in the same layer" may mean being formed in the same process, and the term "being formed and/or provided in different layers" may mean being formed in different processes.

Referring to FIGS. 8A, 9, and 10, a pixel circuit layer PCL and a display element layer DPL may be sequentially disposed on a base layer SUB (or substrate).

The pixel circuit layer PCL may include a buffer layer BFL, a semiconductor layer ACT, a first insulating layer GI1 (or first gate insulating layer), a first conductive layer GAT1, a second insulating layer GI2 (or second gate insulating layer), a second conductive layer GAT2, a third insulating layer ILD (or interlayer insulating layer), a third conductive layer SD1, a first protective layer PSV1 (first via layer, or fourth insulating layer), a fourth conductive layer SD2, and a second protective layer PSV2 (second via layer, a fifth insulating layer).

The buffer layer BFL, the semiconductor layer ACT, the first insulating layer GI1, the first conductive layer GAT1, the second insulating layer GI2, the second conductive layer GAT2, the third insulating layer ILD, the third conductive layer SD1, the first protective layer PSV1, the fourth conductive layer SD2, and the second protective layer PSV2 may be sequentially stacked each other on the base layer SUB. The semiconductor layer ACT, the first conductive layer GAT1, the second conductive layer GAT2, the third conductive layer SD1, and the fourth conductive layer SD2 have been described with reference to FIG. 8A, and therefore, overlapping descriptions will not be repeated.

The base layer SUB may be made of an insulative material such as glass or resin. Also, the base layer SUB may be made of a material having flexibility to be bendable or foldable, and have a single- or multi-layered structure. For example, the material having flexibility may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, cellulose acetate propionate, and the like within the spirit and the scope of the disclosure. However, the material constituting the base layer SUB is not limited to the above-described embodiments.

The buffer layer BFL may be disposed on the entire surface of the base layer SUB. The buffer layer BFL may prevent impurity ions from being diffused, and prevent infiltration of moisture or air. The buffer layer BFL may be an inorganic insulating layer including an inorganic material. The buffer layer BFL may include, for example, at least one of silicon nitride ($SiN_x$), silicon oxide ($SiO_x$), silicon oxynitride ($SiO_xN_y$), and metal oxide such as aluminum oxide ($AlO_x$). The buffer layer BFL may be provided in a single layer, but also be provided in a multi-layer including at least two layers. In case that the buffer layer BFL is provided in the multi-layer, the layers may be formed of a same material or a similar material or be formed of different materials. The buffer layer BFL may be omitted according to the material and process conditions of the base layer SUB.

The semiconductor layer ACT may be disposed on the buffer layer BFL. The semiconductor layer ACT may be disposed between the buffer layer BFL and the first insulating layer GI1. The semiconductor layer ACT may include a semiconductor pattern SCL constituting a seventh transistor T7. The semiconductor pattern SCL may include a first region in contact with a first transistor electrode ET1, a second region in contact with a second transistor electrode ET2, and a channel region located between the first and second regions. The semiconductor pattern SCL of the seventh transistor T7 may be a semiconductor pattern made of amorphous silicon, poly-silicon, low-temperature polysilicon, or the like within the spirit and the scope of the disclosure. However, the disclosure is not limited thereto, and the semiconductor pattern SCL of the seventh transistor T7 may be a semiconductor pattern including an oxide semiconductor. The channel region is, for example, a semiconductor pattern undoped with an impurity, and may be an intrinsic semiconductor. Each of the first region and the second region may be a semiconductor pattern doped with the impurity.

The first insulating layer GI1 may be disposed over the semiconductor layer ACT. The first insulating layer GI1 may be an inorganic insulating layer including an inorganic material. In an example, the first insulating layer GI1 may include a same material or a similar material as the buffer layer BFL or include at least one material selected from the materials as the material constituting the buffer layer BFL. In an embodiment, the first insulating layer GI1 may be an organic insulating layer including an organic material. The first insulating layer GI1 may be provided as a single layer, but also be provided at a multi-layer including at least two layers.

The first conductive layer GAT1 may be disposed on the first insulating layer GI1. As described with reference to FIG. 8A, the first conductive layer GAT1 may include a gate electrode GE1 (or eleventh scan line S11), a first emission control line E1, and a first capacitor electrode Cst_E1. The eleventh scan line S11 may overlap the channel region of the seventh transistor T7, and constitute the gate electrode GE1 of the seventh transistor T7.

The second insulating layer GI2 may be disposed on the first insulating layer GI1 and the first conductive layer GAT1. The second insulating layer GI2 may be roughly disposed throughout the entire surface of the base layer SUB. The second insulating layer GI2 may include a same material or a similar material as the first insulating layer GI1 or include at least one material selected from the materials as the material constituting the first insulating layer GI1.

The second conductive layer GAT2 may be disposed on the second insulating layer GI2. As described with reference to FIG. 8A, the second conductive layer GAT2 may include a second capacitor electrode Cst_E2. The second capacitor electrode Cst_E2 may overlap the first capacitor electrode Cst_E1. The second capacitor electrode Cst_E2 along with the first capacitor electrode Cst_E1 may constitute a storage capacitor Cst.

The third insulating layer ILD may be disposed on the second insulating layer GI2 and the second conductive layer GAT2. The third insulating layer ILD may be roughly disposed throughout the entire surface of the base layer SUB.

The third insulating layer ILD may include an inorganic insulating material such as a silicon compound or a metal oxide. For example, the third insulating layer ILD may include silicon oxide, silicon nitride, silicon oxynitride, aluminum oxide, tantalum oxide, hafnium oxide, zirconium oxide, titanium oxide, or any combination thereof. The third insulating layer ILD may be a single layer or a multi-layer of different materials.

The third conductive layer SD1 may be disposed on the third insulating layer ILD. As described with reference to FIG. 8A, the third conductive layer SD1 may include a fourth bridge pattern BRP4 and a first sub-power line PL_T1.

The first sub-power line PL_T1 may overlap one region or a region of the semiconductor pattern SCL, be connected to the one region or a region of the semiconductor pattern SCL through a contact hole penetrating the first insulating layer GI1, the second insulating layer GI2, and the third insulating layer ILD, and constitute the first transistor electrode ET1 of the seventh transistor T7.

The fourth bridge pattern BRP4 may overlap another region of the semiconductor pattern SCL, be connected to the another region of the semiconductor pattern SCL through a contact hole penetrating the first insulating layer GI1, the second insulating layer GI2, and the third insulating layer ILD, and constitute the second transistor electrode ET2 of the seventh transistor T7.

The first protective layer PSV1 may be disposed on the third insulating layer ILD and the third conductive layer SD1. The first protective layer PSV1 may be roughly disposed throughout the entire surface of the base layer SUB.

The first protective layer PSV1 may include an organic insulating material such as polyacrylates resin, epoxy resin, phenolic resin, polyamides resin, polyimides resin, unsaturated polyesters resin, poly-phenylene ethers resin, poly-phenylene sulfides resin, and benzocyclobutene (BCB).

The fourth conductive layer SD2 may be disposed on the first protective layer PSV1. The fourth conductive layer SD2 may include a sixth bridge pattern BRP6, a second data line D2, and a first power line PL1.

The sixth bridge pattern BRP6 may overlap the fourth bridge pattern BRP4, and be connected to the fourth bridge pattern BRP4 through a contact hole CNT_3 penetrating the first protective layer PSV1.

The second data line D2 may overlap the first sub-power line PL_T1.

The first power line PL1 may be disposed to be spaced apart from the sixth bridge pattern BRP6 and the second data line D2. The first power line PL1 may be disposed in a majority of the other area except the sixth bridge pattern BRP6 and the second data line D2 to cover or overlap a lower configuration (for example, the storage capacitor Cst).

The second protective layer PSV2 may be disposed on the first protective layer PSV1 and the fourth conductive layer SD2. The second protective layer PSV2 may be roughly disposed throughout the entire surface of the base layer SUB. The second protective layer PSV2 may include a same material or a similar material as the first protective layer PSV1 or include at least one material selected from the materials as the material constituting the first protective layer PSV1.

The display element layer DPL may be provided on the second protective layer PSV2.

The display element layer DPL may include a first electrode ELT1, a pixel defining layer PDL, a light emitting element LD (or light emitting elements), an insulating layer INS, and a second electrode ELT2. The first electrode ELT1, the pixel defining layer PDL, the light emitting element LD, the insulating layer INS, and the second electrode ELT2 may be sequentially disposed or formed on the second protective layer PSV2 (or the pixel circuit layer PCL).

The first electrode ELT1 may be disposed on the second protective layer PSV2. The first electrode ELT1 may be disposed corresponding to the emission area EA (see FIG. 9) of each pixel. In an embodiment, the first electrode ELT1 may be an anode electrode.

The first electrode ELT1 may be connected to the sixth bridge pattern BRP6 through a contact hole CNT_2 exposing the sixth bridge pattern BRP6 while penetrating the second protective layer PSV2. The first electrode ELT1 may be connected to the second transistor electrode ET2 of the seventh transistor T7 through the sixth bridge pattern BRP6 and the fourth bridge pattern BRP4.

The pixel defining layer PDL may be disposed or formed on the second protective layer PSV2 and the first electrode ELT1 in the non-emission area NEA (see FIG. 9). The pixel defining layer PDL may partially overlap an edge of the first electrode ELT1 in the non-emission area NEA.

In an embodiment, the pixel defining layer PDL may further include a spacer in the non-emission area NEA. The spacer may protrude in the third direction DR3 from the pixel defining layer PDL in the non-emission area NEA, and allow a mask or the like, which is used in a manufacturing process of the display panel 100 (see FIG. 3), to be spaced apart from the pixel circuit layer PCL (or the display element layer DPL).

The light emitting element LD may be disposed on the first electrode ELT1 in the emission area EA. The light emitting element LD may include a second semiconductor layer 13 which is in contact with or electrically connected to the first electrode ELT1, an active layer 12 disposed on the second semiconductor layer 13, and a first semiconductor layer 11 which is disposed on the active layer 12 and is electrically connected to the second electrode ELT2. The light emitting element LD may emit light while electron-hole pairs are recombined in the active layer 12. A detailed configuration (for example, the first semiconductor layer 11, the active layer 12, and the second semiconductor layer 13) of the light emitting element LD will be described later with reference to FIG. 11.

The insulating layer INS (or planarization layer) may be entirely provided on the base layer SUB to cover or overlap the pixel defining layer PDL, the first electrode ELT1, and the light emitting element LD. The insulating layer INS may be provided in a form filling an empty space between the pixel defining layer PDL and the light emitting element LD and an empty space between the light emitting element LD and an adjacent light emitting element. The insulating layer INS may prevent a side surface of the light emitting element LD from being in contact with another conductive material (for example, the second electrode ELT2). Also, the insulating layer INS may prevent an electrical short circuit between the first electrode ELT1 and the second electrode ELT2 by covering or overlapping the first electrode ELT1. To this end, the insulating layer INS may include an insulating material including an organic material.

A contact hole exposing the first semiconductor layer 11 of the light emitting element LD may be formed in the insulating layer INS. However, the disclosure is not limited thereto. For example, a thickness of the insulating layer INS may be smaller than or equal to that of the light emitting element LD in the third direction DR3, and the insulating layer INS may expose the first semiconductor layer 11.

The second electrode ELT2 (or common electrode) may be provided and/or formed on the insulating layer INS (and the light emitting element LD). The second electrode ELT2 may be connected to the first semiconductor layer 11 of the light emitting element LD through a contact hole, or may be connected to or may be directly connected to the first semiconductor layer 11 of the light emitting element LD.

The second electrode ELT2 may also be provided or disposed on the pixel defining layer PDL. The second electrode ELT2 may be entirely provided on the base layer SUB. The second electrode ELT2 may be a common layer commonly provided in a pixel and pixels adjacent thereto (for example, the eleventh to thirteenth pixels PX11 to PX13 shown in FIG. 9). In an embodiment, the second electrode ELT2 may be a cathode electrode. The second electrode ELT2 may be connected to the second driving power source VSS (see FIG. 4), so that the voltage of the second driving power source VSS is transferred to the second electrode ELT2.

The second electrode ELT2 may be made of various transparent conductive materials (or substances) so as to allow light emitted from the light emitting element LD to advance in the third direction DR3 without loss of light. In an example, the second electrode ELT2 may include at least one of various transparent conductive materials (or substances) including indium tin oxide (ITO), indium zinc oxide (IZO), zinc oxide (ZnO), indium gallium zinc oxide (IGZO), indium tin zinc oxide (ITZO), and the like, and be substantially transparent or translucent to satisfy a transmittance (or transmittancy). However, the material of the second electrode ELT2 is not limited to the above-described embodiment.

In an embodiment, a thin film encapsulation layer (or encapsulation layer) may be provided and/or formed on the second electrode ELT2. The thin film encapsulation layer may be provided in a form including an organic insulating layer, an inorganic insulating layer, or the organic insulating layer disposed on the inorganic insulating layer. The thin film encapsulation layer may be made of a transparent insulating material so as to minimize loss of light advancing in the third direction DR3.

In an embodiment, a light conversion pattern layer may be disposed on the display element layer DPL. The light conversion pattern layer may convert a wavelength (or color) of light emitted from the display element layer DPL by using a quantum dot, and allow light having a specific or given wavelength (or specific or given color) to be selectively transmitted therethrough by using a color filter. The light conversion pattern layer may be formed on a base surface provided by the display element layer DPL through a continuous process, or be formed through an adhesion process using an adhesive layer.

For example, the quantum dot may be provided above the light emitting element LD, and convert light emitted from the light emitting element LD into light of a specific or given color. In an example, in case that a pixel (for example, the eleventh pixel PX11 (see FIG. 9)) is a red pixel, the light conversion pattern layer may include color conversion particles of a red quantum dot which converts light (or light of a first color) emitted from the light emitting element LD (for example, a first light emitting element LD1) into light of red (or light of a second color). In case that a pixel (for example, the twelfth pixel PX12 (see FIG. 9)) is a green pixel, the light conversion pattern layer may include color conversion particles of a green quantum dot which converts light emitted from the light emitting element LD (for example, a second light emitting element LD2) into light of green (or light of a third color). In case that a pixel (for example, the thirteenth pixel PX13 (see FIG. 9)) is a blue pixel, the light conversion pattern layer may include color conversion particles of a blue quantum dot which converts light emitted from the light emitting element LD (for example, a third light emitting element LD3) into light of blue (or light of a fourth color). In an embodiment, the light conversion pattern layer may include light scattering particles instead of color conversion particles. In an example, in case that the light emitting element LD (for example, the third light emitting element LD3) emits blue-based light, the light conversion pattern layer of the pixel (for example, the thirteenth pixel PX13) may include light scattering particles. The above-described light conversion pattern layer may be omitted in an embodiment.

Also, the light conversion pattern layer may include a color filter. The color filter may include a color filter material which allows light of a specific or given color, which is converted by the color conversion particles, to be selectively transmitted therethrough. In case that the pixel (for example, the eleventh pixel PX11) is a red pixel, the color filter may include a red color filter. In case that the pixel (for example, the twelfth pixel PX12) is a green pixel, the color filter may include a green color filter. In case that the pixel (for example, the thirteenth pixel PX13) is a blue pixel, the color filter may include a blue color filter.

Figure 11:
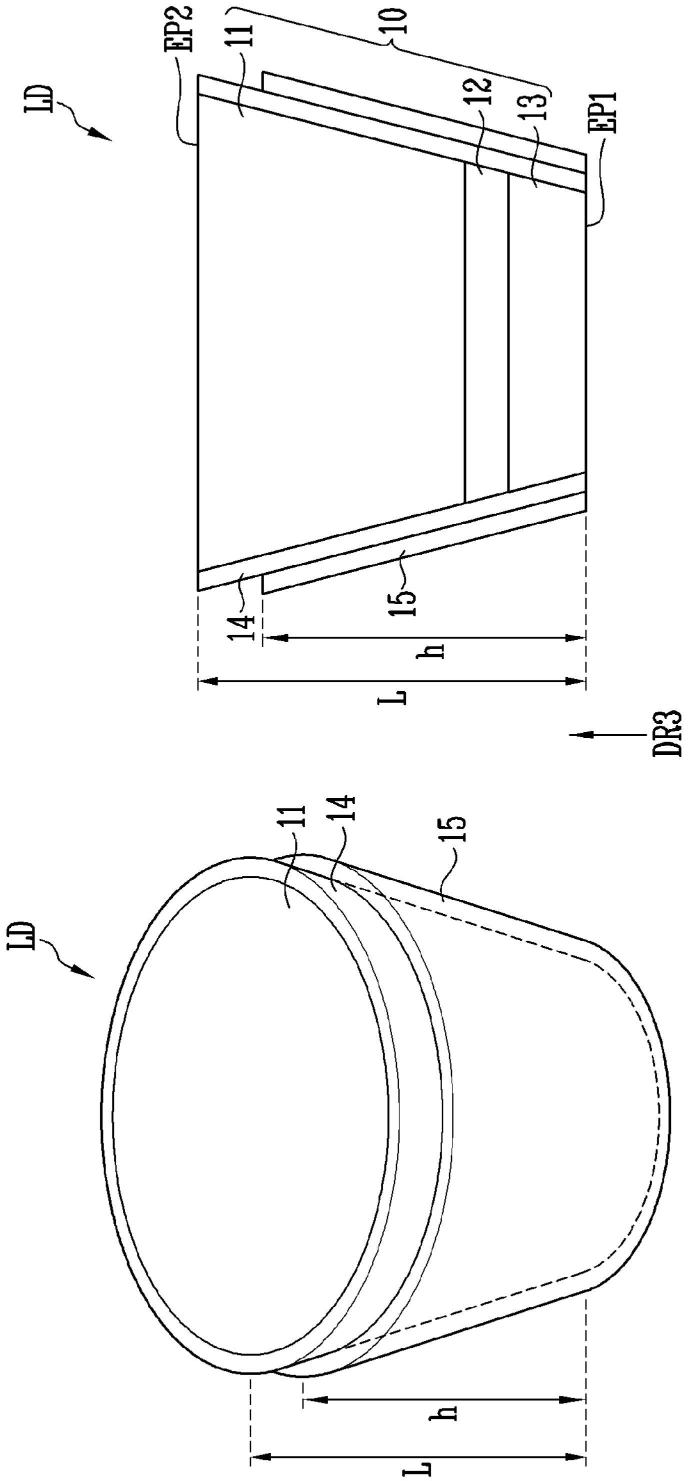
FIG. 11 is a view schematically illustrating a light emitting element in accordance with an embodiment.

FIG. 11 is a view schematically illustrating a light emitting element in accordance with an embodiment.

Referring to FIG. 11, the light emitting element LD may include a first semiconductor layer 11, a second semiconductor layer 13, and an active layer 12 interposed between the first and second semiconductor layers 11 and 13. In an example, the light emitting element LD may implement a light emitting stack structure 10 in which the second semiconductor layer 13, the active layer 12, and the first semiconductor layer 11 may be sequentially stacked each other.

The light emitting element LD may be provided in a shape extending in one direction or a direction. In case that assuming that an extending direction of the light emitting element LD is a length L direction, the light emitting element LD may include a first end portion EP1 (or lower end portion) and a second end portion EP2 (or upper end portion) along the extending direction. In an embodiment, the length L direction may be parallel to the third direction DR3. Any one of the first semiconductor layer 11 and the second semiconductor layer 13 may be located at the first end portion EP1 (or lower end portion) of the light emitting element LD, and the other of the first semiconductor layer 11 and the second semiconductor layer 13 may be located at the second end portion EP2 (or upper end portion) of the light emitting element LD. In an example, the second semiconductor layer 13 may be located at the first end portion EP1 (or lower end portion) of the light emitting element LD, and the first semiconductor layer 11 may be located at the second end portion EP2 (or upper end portion) of the light emitting element LD.

The light emitting element LD may be provided in various shapes. In an example, the light emitting element LD may have a rod-like shape, a bar-like shape, or a pillar shape, which is long in its length L direction (for example, its aspect ratio is greater than 1). The light emitting element LD may have a rod-like shape, a bar-like shape, or a pillar shape, which is short in its length L direction (for example, its aspect ratio is smaller than 1).

In an embodiment, the light emitting element LD may have a pillar shape in which a diameter of the first end portion EP1 and a diameter of the second end portion EP2 are different from each other. In an example, the light emitting element LD may have a pillar shape in which the diameter of the first end portion EP1 is smaller than the diameter of the second end portion EP2. The light emitting element LD may have an elliptical pillar shape of which diameter increases as approaching the top thereof along a length L direction (or the third direction DR3).

The length L of the light emitting element LD in the length L direction may be greater or smaller than the diameter (for example, the width of a first cross-section) of the first end portion EP1 and the diameter (for example, the width of a second cross-section) of the second end portion EP2. In an example, the length L of the light emitting element LD may be greater than the diameter of the first end portion EP1 and be smaller than the diameter of the second end portion EP2. However, the disclosure is not limited thereto. In an embodiment, the length L of the light emitting element LD may be equal to the diameter of the first end portion EP1 and be equal to the diameter of the second end portion EP2. The above-described light emitting element LD may include, for example, a light emitting diode (LED) manufactured small enough to have a diameter and/or a length L to a degree of nanometer scale to micrometer scale.

The size of the light emitting element LD may be variously changed to be suitable for requirements (or design conditions) of a lighting device or a self-luminescent display device, to which the light emitting element LD may be applied.

The second semiconductor layer 13 may include, for example, at least one p-type semiconductor layer. In an example, the second semiconductor layer 13 may include at least one semiconductor material among InAlGaN, GaN, AlGaN, InGaN, AlN, and InN, and include a p-type semiconductor layer doped with a second conductivity type dopant (or p-type dopant) such as Mg, Zn, Ca, Sr or Ba. However, the material constituting the second semiconductor layer 13 is not limited thereto. The second semiconductor layer 13 may be formed of various materials. In an embodiment, the second semiconductor layer 13 may include a gallium nitride (GaN) semiconductor material doped with a second conductivity type dopant (or p-type dopant). The second semiconductor layer 13 may include an upper surface in contact with the active layer 12 along the length L direction of the light emitting element LD and a lower surface exposed to the outside.

The active layer 12 is disposed on the second semiconductor layer 13, and may be formed in a single-quantum well structure or a multi-quantum well structure. In an example, in case that the active layer 12 is formed in the multi-quantum well structure, a barrier layer (not shown), a strain reinforcing layer (not shown), and a well layer (not shown), which constitute one unit, may be periodically and repeatedly stacked each other in the active layer 12. The strain reinforcing layer may have a lattice constant smaller than that of the barrier layer, to further reinforce strain, for example, compressive strain applied to the well layer. However, the structure of the active layer 12 is not limited to the above-described embodiment.

The active layer 12 may emit light having a wavelength of 400 nm to 900 nm, and use a double hetero structure. In an embodiment, a clad layer (not shown) doped with a conductivity type dopant may be formed on the top and/or the bottom of the active layer 12 along the length L direction of the light emitting element LD. In an example, the clad layer may be formed as an AlGaN layer or InAlGaN layer. In an embodiment, a material such as AlGaN or InAlGaN may be used to form the active layer 12. The active layer 12 may be formed with various materials. The active layer 12 may include a first surface in contact with the second semiconductor layer 13 and a second surface in contact with the first semiconductor layer 11.

In case that a corresponding signal (or voltage) is applied to each of the first end portion EP1 and the second end portion EP2 of the light emitting element LD, the light emitting element LD emits light as electron-hole pairs are recombined in the active layer 12. The light emission of the light emitting element LD is controlled by using such a principle, so that the light emitting element LD can be used as a light source (or light emitting source) for various light emitting devices, including a pixel of a display device.

The first semiconductor layer 11 is disposed on the active layer 12, and may include a semiconductor layer having a type different from that of the second semiconductor layer 13. In an example, the first semiconductor layer 11 may include at least one n-type semiconductor layer. For example, the first semiconductor layer 11 may include any one semiconductor material among InAlGaN, GaN, AlGaN, InGaN, AlN, and InN, and be an n-type semiconductor layer doped with a first conductivity type dopant (or n-type dopant) such as Si, Ge or Sn. However, the material constituting the first semiconductor layer 11 is not limited thereto. The first semiconductor layer 11 may be formed with various materials. In an embodiment, the first semiconductor layer 11 may include a gallium nitride (GaN) semiconductor material doped with a first conductivity type dopant (or n-type dopant). The first semiconductor layer 11 may include a lower surface in contact with the active layer 12 along the length L direction of the light emitting element LD and an upper surface exposed to the outside. The upper surface of the first semiconductor layer 11 may be the second end portion EP2 (or upper end portion) of the light emitting element LD.

In an embodiment, the second semiconductor layer 13 and the first semiconductor layer 11 may have different thicknesses in the length L direction of the light emitting element LD (or the third direction DR3). In an example, the first semiconductor layer 11 may have a thickness relatively thicker than that of the second semiconductor layer 13 along the length L direction of the light emitting element LD (or the third direction DR3). Accordingly, the active layer 12 of the light emitting element LD may be located more adjacent to the lower surface of the second semiconductor layer 13 than the upper surface of the first semiconductor layer 11.

Although it is illustrated that each of the first semiconductor layer 11 and the second semiconductor layer 13 is one layer or a layer, the disclosure is not limited thereto. In an embodiment, each of the first semiconductor layer 11 and the second semiconductor layer 13 may further include at least one layer or a layer, for example, a clad layer and/or a Tensile Strain Barrier Reducing (TSBR) layer according to the material of the active layer 12. The TSBR layer may be a strain reducing layer disposed between semiconductor layers having different lattice structures to perform a buffering function for reducing a lattice constant difference. The TSBR layer may be a p-type semiconductor layer such as p-GAInP, p-AlInP or p-AlGaInP, but the disclosure is not limited thereto.

In an embodiment, the light emitting element LD may further include an additional electrode (not shown) (hereinafter, referred to as a 'first additional electrode') disposed on the bottom of the second semiconductor layer 13, in addition to the first semiconductor layer 11, the active layer 12, and the second semiconductor layer 13, which are described above. Also, in other embodiments, the light emitting element LD may further include another additional electrode (not shown) (hereinafter, referred to as a 'second additional electrode') disposed on the top of the first semiconductor layer 11.

Each of the first and second additional electrodes may be an ohmic contact electrode, but the disclosure is not limited thereto. In an embodiment, each of the first and second additional electrodes may be a schottky contact electrode. The first and second additional electrodes may include a conductive material. For example, the first and second additional electrodes may include an opaque metal using one or mixture of chromium (Cr), titanium (Ti), aluminum (Al), gold (Au), nickel (Ni), and any alloy thereof, but the disclosure is not limited thereto. In an embodiment, the first and second additional electrodes may include a transparent conductive oxide such as indium tin oxide (ITO), indium zinc oxide (IZO), zinc oxide (ZnO), indium gallium zinc oxide (IGZO), or indium tin zinc oxide (ITZO).

Materials respectively included in the first and second additional electrodes may be identical to or different from each other. The first and second additional electrodes may be substantially transparent or translucent. Accordingly, light generated in the light emitting element LD can be emitted to the outside of the light emitting element LD by passing through the first and second additional electrodes. In an embodiment, in case that light generated in the light emitting element LD does not pass through the first and second additional electrodes and is emitted to the outside of the light emitting element LD through an area except both the end portions EP1 and EP2 of the light emitting element LD, the first and second additional electrodes may include an opaque metal.

In an embodiment, the light emitting element LD may further include an insulative film 14. However, in an embodiment, the insulative film 14 may be omitted, and be provided to cover or overlap only a portion of the light emitting stack structure 10.

The insulative film 14 can prevent an electrical short circuit that may occur in case that the active layer 12 is in contact with a conductive material except the first semiconductor layer 11 and the second semiconductor layer 13. Also, the insulative film 14 minimizes a surface defect of the light emitting element LD, thereby improving the lifetime and light emission efficiency of the light emitting element LD. Also, in case that light emitting elements LD are densely disposed, the insulative film 14 can prevent an unwanted short circuit that may occur between the light emitting elements LD. Whether the insulative film 14 is to be provided is not limited as long as the active layer 12 can be prevented from being short-circuited with an external conductive material.

The insulative film 14 may be provided in a shape entirely surrounding an outer circumferential surface of the light emitting stack structure 10 including the second semiconductor layer 13, the active layer 12, and the first semiconductor layer 11.

In the above-described embodiment, it has been described that the insulative film 14 is provided in a shape entirely surrounding an outer circumferential surface of each of the second semiconductor layer 13, the active layer 12, and the first semiconductor layer 11. However, the disclosure is not limited thereto. In an embodiment, in case that the light emitting element LD may include the first additional electrode, the insulative film 14 may entirely surround an outer circumferential surface of each of the first additional electrode, the second semiconductor layer 13, the active layer 12, and the first semiconductor layer 11. In other embodiments, the insulative film 14 may not entirely surround the outer circumferential surface of the first additional electrode. For example, the insulative film 14 surrounds only a portion of the outer circumferential surface of the first additional electrode, and may not surround the other portion of the outer circumferential surface of the first additional electrode. Also, in an embodiment, in case that the first additional electrode is disposed at the first end portion EP1 (or lower end portion) of the light emitting element LD and the second additional electrode is disposed at the second end portion EP2 (or upper end portion) of the light emitting element LD, the insulative film 14 may expose at least one area or an area of each of the first and second additional electrodes.

The insulative film 14 may include a transparent insulating material. For example, the insulative film 14 may include at least one insulating material selected from the group consisting of silicon oxide ($SiO_x$), silicon nitride ($SiN_x$), silicon oxynitride ($SiO_xN_y$), aluminum oxide ($AlO_x$), titanium oxide ($TiO_x$), hafnium oxide ($HfO_x$), titanium-strontium oxide ($SrTiO_x$), cobalt oxide ($Co_xO_y$), magnesium oxide (MgO), zinc oxide ($ZnO_x$)(which may be ZnO and/or $ZnO_2$), ruthenium oxide ($RuO_x$), nickel oxide (NiO), tungsten oxide ($WO_x$), tantalum oxide ($TnO_x$), gadolinium oxide ($GdO_x$), zirconium oxide ($ZrO_x$), gallium oxide ($GaO_x$), vanadium oxide ($V_xO_y$), ZnO:Al, ZnO:B, $In_xO_y$:H, niobium oxide ($Nb_xO_y$), magnesium fluoride ($MgF_x$), aluminum fluoride ($AlF_x$), Alucone polymer film, titanium nitride (TiN), tantalum nitride (TaN), aluminum nitride ($AlN_x$), gallium nitride (GaN), tungsten nitride (WN), hafnium nitride (HfN), niobium nitride (NbN), gadolinium nitride (GdN), zirconium nitride (ZrN), vanadium nitride (VN), and the like within the spirit and the scope of the disclosure. However, the disclosure is not limited thereto, and various materials having insulating properties may be used as the material of the insulative film 14.

The insulative film 14 may be provided in the form of a single layer or be provided in the form of a multi-layer including at least two layers. In an example, in case that the insulative film 14 may be a double layer including a first layer and a second layer, which may be sequentially stacked each other, the first layer and the second layer may be made of different materials (or ingredients), and be formed through different processes. In an embodiment, the first layer and the second layers may include a same material or a similar material.

The light emitting element LD may further include a reflection member 15 surrounding an outer circumferential surface of the insulative film 14.

The reflection member 15 may be made of a material having a reflexibility to allow light emitted from the light emitting element LD to be concentrated on a specific or given area while allowing the light emitted from the light emitting element LD to advance in the image display direction. In an example, the reflection member 15 may be made of a conductive material (or substance) having a reflexibility. The reflection member 15 may include an opaque metal. The reflection member 15 may include a same material or a similar material as the first electrode ELT1, or include at least one material selected from the materials as the material constituting the first electrode ELT1.

In an embodiment, the reflection member 15 may have a slope constant in an oblique direction, which is inclined with respect to the third direction DR3, so as to collimate light emitted from the active layer 12 of the light emitting element LD toward a specific or given area. As described above, since the light emitting element LD has an elliptical pillar shape of which diameter increases as approaching the top thereof along the length L direction (or the third direction DR3), the insulative film 14 surrounding the outer circumferential surface of the light emitting stack structure 10 and the reflection member 15 surrounding the outer circumferential surface of the insulative film 14 may have a constant slope in case that viewed on a plane (or in a plan view). In case that the reflection member 15 has a constant slope, light emitted from the active layer 12 of the light emitting element LD may be reflected by the reflection member 15 to be concentrated on a specific or given area. For example, the reflection member 15 may allow light radially (or in radial direction) from the active layer 12 of the light emitting element LD to be concentrated on a specific or given area.

The above-described reflection member 15 may partially surround the outer circumferential surface of the insulative film 14 to expose a portion of the insulative film 14. A height h of the reflection member 15 in the third direction DR3 may be smaller than the length L of the light emitting element LD. One end portion (or lower end portion) of the reflection member 15 may be located on a same line (or a same surface) as the first end portion EP1 of the light emitting element LD, and the other end portion (or upper end portion) of the reflection member 15 may be located lower than the second end portion EP2 of the light emitting element LD in the third direction DR3.

In the light emitting element LD, the second semiconductor layer 13 and the first semiconductor layer 11, which are implemented as different types of semiconductor layers, may be located to face each other in the length L direction of the corresponding light emitting element LD (or the third direction DR3). The second semiconductor layer 13 may be located at the first end portion EP1 (or lower end portion) of the light emitting element LD, and the first semiconductor layer 11 may be located at the second end portion EP2 (or upper end portion) of the light emitting element LD. The light emitting element LD may be a light emitting element having a vertical structure in which the second semiconductor layer 13, the active layer 12, and the first semiconductor layer 11 may be sequentially stacked each other in the length L direction of the corresponding light emitting element LD (or the third direction DR3).

The above-described light emitting element LD may be used as a light emitting source (or light source) of various display devices.

Figure 12:
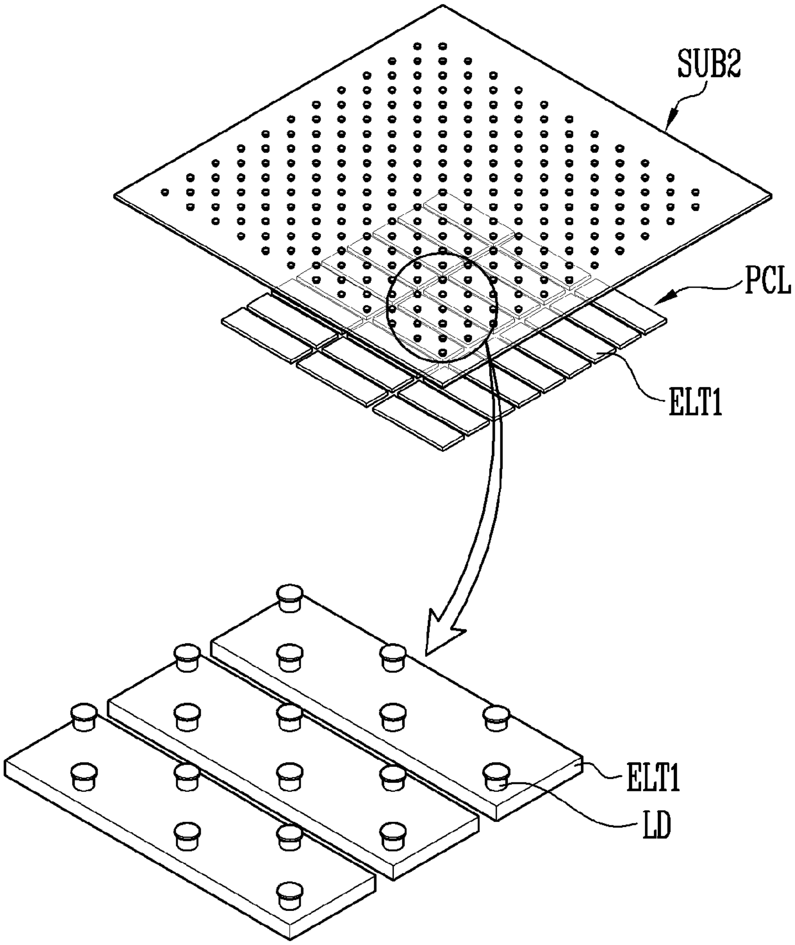
FIG. 12 is a view illustrating a process of aligning light emitting elements included in the light emitting unit shown in FIG. 9.

FIG. 12 is a view illustrating a process of aligning light emitting elements included in the light emitting unit shown in FIG. 9.

Referring to FIGS. 1 and 9 to 12, the light emitting element LD may be formed separately from the pixel circuit layer PCL (and the first electrode ELT1), and be disposed on the first electrode ELT1 through a transfer process using a second substrate SUB2 (for example, a transfer film). In a state in which the first electrode ELT1 exposed on the pixel circuit layer PCL and the first end portion EP1 (see FIG. 11) of the light emitting element LD are in contact with or connected to each other, laser light is irradiated onto or heat may be applied to an area in which the first electrode ELT1 and the light emitting element LD are in contact with each other, so that the light emitting element LD can be bonded to or onto the first electrode ELT1. Subsequently, the second substrate SUB2 may be separated or removed from the light emitting element LD, and pixels (for example, the eleventh to thirteen pixels PX11 to PX13 shown in FIG. 9) may be formed.

In the manufacturing process described above, a test (for example, a bonding test) for checking whether the light emitting element LD has been normally aligned on the first electrode ELT1 and whether the light emitting element LD has been normally bonded to the first electrode ELT1 may be required. In embodiments, the test can be performed by using one transistor, for example, the seventh transistor T7 in the pixel driving circuit PXC as described with reference to FIGS. 6 and 7.

Figure 13:
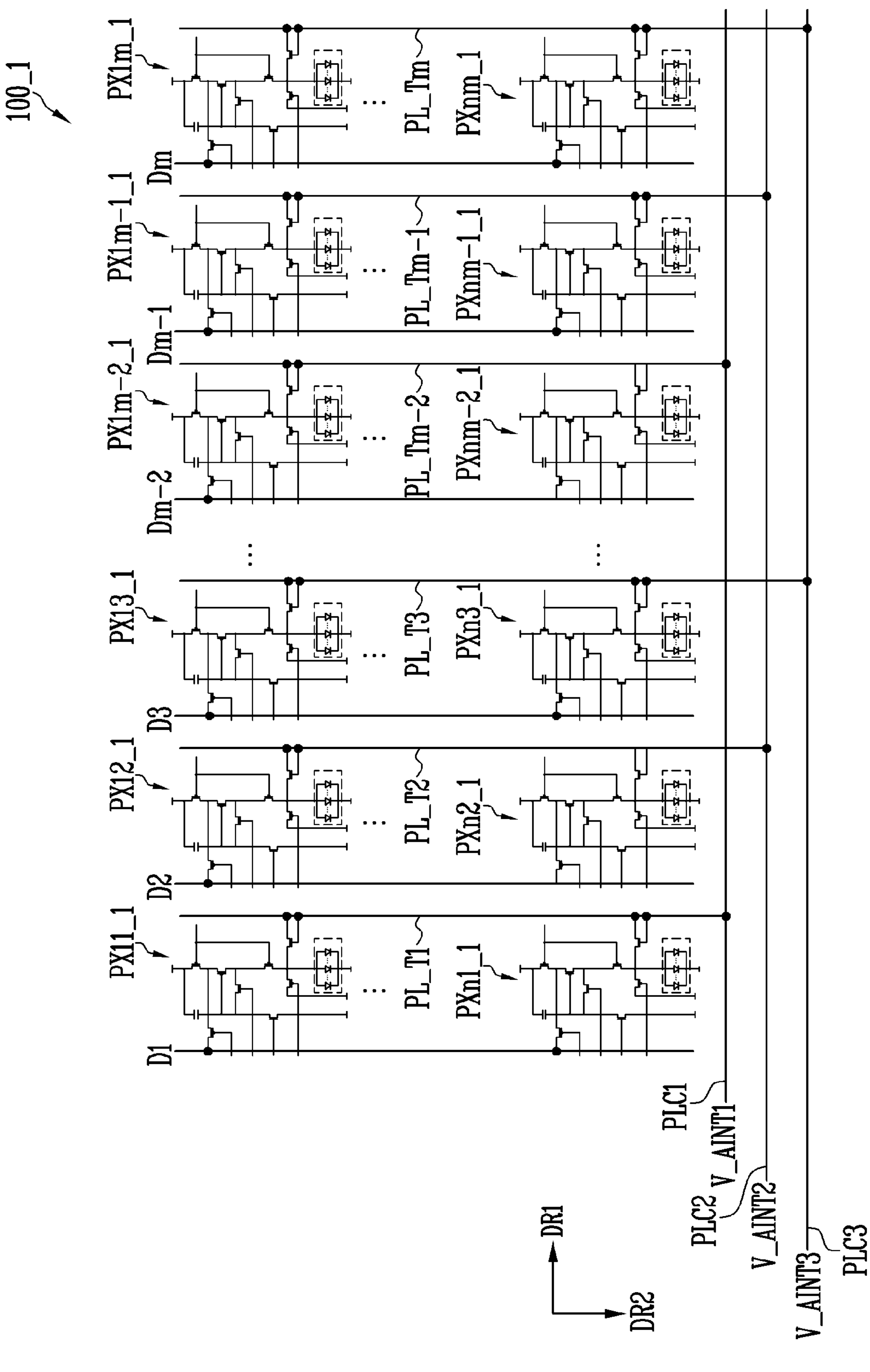
FIG. 13 is a schematic circuit diagram illustrating an embodiment of the display panel included in the display device shown in FIG. 1.
Figure 14:
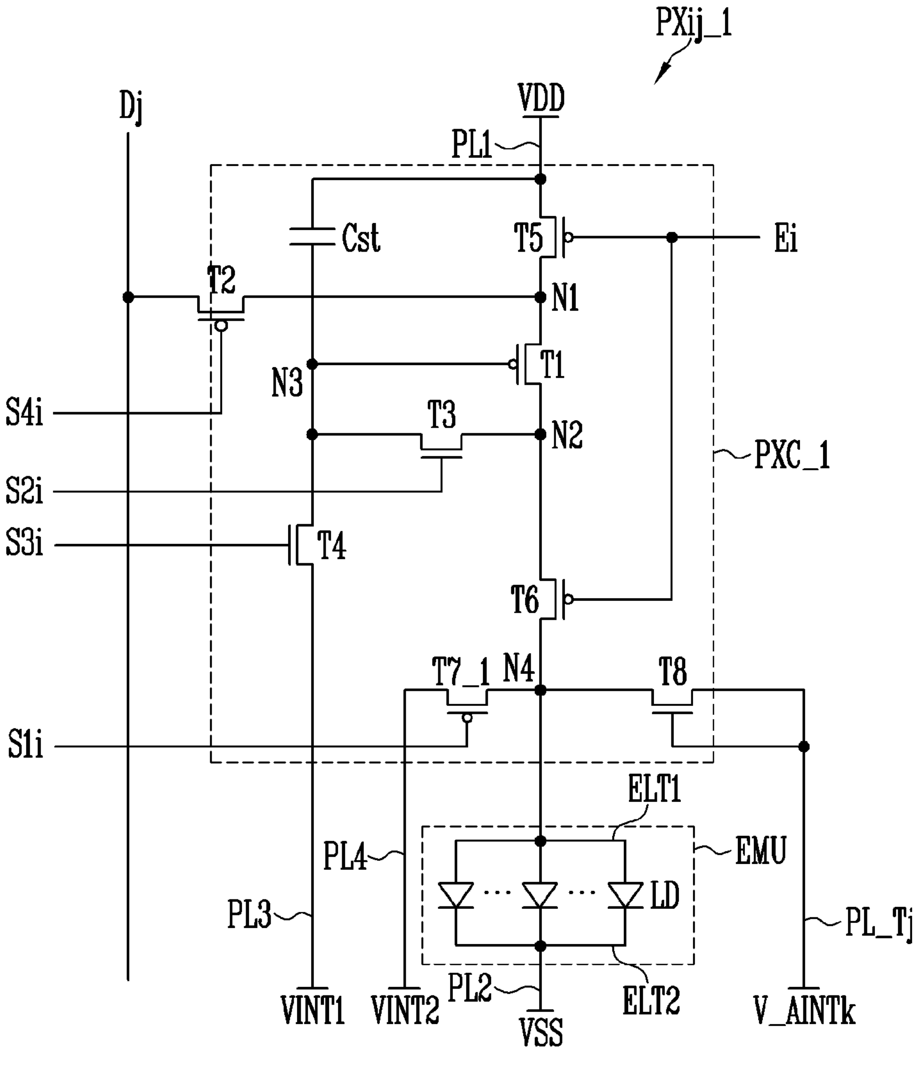
FIG. 14 is a schematic circuit diagram illustrating an embodiment of a pixel included in the display panel shown in FIG. 13.

FIG. 13 is a schematic circuit diagram illustrating an embodiment of the display panel included in the display device shown in FIG. 1. FIG. 14 is a schematic circuit diagram illustrating an embodiment of a pixel included in the display panel shown in FIG. 13. Pixels PX11_1 to PXnm_1 included in a display panel 100_1 shown in FIG. 13 are substantially identical to one another. Therefore, for convenience of description, an ijth pixel PXij_1 which is located on an ith horizontal line (or ith pixel row) and is connected to a jth data line Dj is illustrated in FIG. 14.

Referring to FIGS. 1, 3, 4, 13, and 14, the display panel 100_1 shown in FIG. 13 may be substantially identical or similar to the display panel 100 shown in FIG. 3, except a pixel circuit (for example, a pixel driving circuit PXC_1) of each of the pixels PX11_1 to PXnm_1. The ijth pixel PXij_1 shown in FIG. 14 may be substantially identical or similar to the ijth pixel PXij shown in FIG. 4, except a seventh transistor T7_1 and an eighth transistor T8. Therefore, overlapping descriptions will not be repeated.

The seventh transistor T7_1 (or bypass transistor) may be connected between the first electrode ELT1 of the light emitting unit EMU (for example, the fourth node N4) and a fourth power line PL4. The voltage of the second initialization power source VINT2 may be applied to the fourth power line PL4. A gate electrode of the seventh transistor T7_1 may be connected to the 1ith scan line S1*i*. the seventh transistor T7_1 may be turned on in case that the first scan signal is supplied to the 1ith scan line S1*i*, to connect the first electrode ELT1 of the light emitting unit EMU and the fourth power line PL4 to each other. The voltage of the second initialization power source VINT2 may be supplied to the first electrode ELT1 of the light emitting unit EMU, and the parasitic capacitor of the light emitting element LD may be discharged. The pixels PX11_1 to PXnm_1 may be commonly connected to the fourth power line PL4 to which the voltage of the second initialization power source VINT2 may be applied.

The ijth pixel PXij_1 (or the pixel driving circuit PXC_1) may further include the eighth transistor T8.

The eighth transistor T8 (or switching transistor) may be connected between the first electrode ELT1 of the light emitting unit EMU (for example, the fourth node N4) and the jth sub-power line PL_Tj. A gate electrode of the eighth transistor T8 may be connected to the jth sub-power line PL_Tj.

In an embodiment, the eighth transistor T8 may be formed as an oxide semiconductor transistor. For example, the eighth transistor T8 may be an N-type oxide semiconductor transistor (for example, an NMOS transistor), and include an oxide semiconductor layer as an active layer. Accordingly, a gate on voltage at which the eighth transistor T8 is turned on may have a logic high level.

In case that a kth test signal V_AINTk having the logic high level is supplied to the jth sub-power line PL_Tj, the eighth transistor T8 may be turned on to electrically connect the first electrode ELT1 of the light emitting unit EMU and the jth sub-power line PL_Tj to each other. The kth test signal V_AINTk may be one of the test signals V_AINT1 to V_AINT3 described with reference to FIG. 3. The kth test signal V_AINTk having the logic high level may be supplied to the first electrode ELT1 of the light emitting unit EMU, and the light emitting unit EMU (or the light emitting element LD) may emit light or may not emit light in response to the kth test signal V_AINTk. Whether the ijth pixel PXij_1 normally emits light or a characteristic of the ijth pixel PXij_1 may be checked based on an emission state and/or a non-emission state of the light emitting unit EMU. For example, whether the light emitting unit EMU (or the light emitting element LD) normally emits light or whether the light emitting element LD in the light emitting unit EMU has been normally bonded to the first electrode ELT1 can be checked based on a change in current flowing into the light emitting unit EMU from the jth sub-power line PL_Tj through the eighth transistor T8.

In case that the kth test signal V_AINTk having the logic low level is supplied to the jth sub-power line PL_Tj or in case that the kth test signal V_AINTk is not supplied to the jth sub-power line PL_Tj, the eighth transistor T8 may maintain the turn-off state.

As described above, the ijth pixel PXij_1 may include the eighth transistor T8 which is connected between the first electrode ELT1 of the light emitting unit EMU and the jth sub-power line PL_Tj and has the gate electrode connected to the jth sub-power line PL_Tj, and a lighting test on the light emitting unit EMU (or the light emitting element LD) can be performed by using the eighth transistor T8. For example, a process for the lighting test can be simplified.

Figure 15:
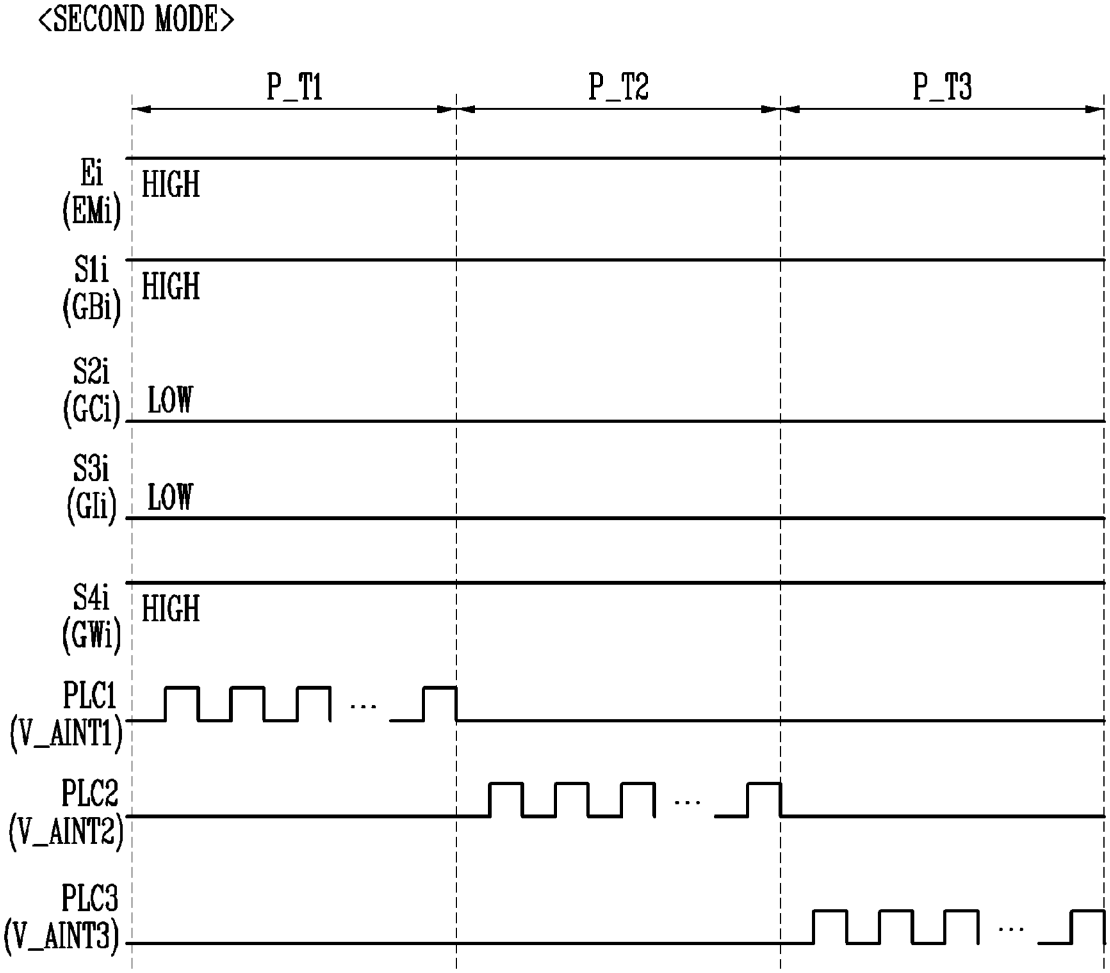
FIG. 15 is a timing diagram illustrating an example of signals supplied to the pixel shown in FIG. 14 in the second mode.

FIG. 15 is a timing diagram illustrating an example of signals supplied to the pixel shown in FIG. 14 in the second mode.

Referring to FIGS. 1, 6, and 13 to 15, signals (for example, an ith emission control signal EMi, a second scan signal GCi, a third scan signal GIi, a fourth scan signal GWi, and test signals V_AINT1 to V_AINT3) shown in FIG. 15 are substantially identical or similar to those shown in FIG. 6, except a first scan signal GBi, and therefore, overlapping descriptions will not be repeated.

In the second mode, the scan driver 200 may supply the first scan signal GBi having the logic high level HIGH to the 1ith scan line S1*i*. The seventh transistor T7_1 may be turned off in response to the first scan signal GBi having the logic high level HIGH. For example, in the second mode, the first to seventh transistors T1 to T7_1 may be turned off or maintain the turn-off state.

In an embodiment, the power supply 500 may provide the first test signal V_AINT1 having a square wave form to the first common power line PLC1 in a first test period P_T1, provide the second test signal V_AINT2 having the square wave form to the second common power line PLC2 in a second test period P_T2, and provide the third test signal V_AINT3 having the square wave form to the third common power line PLC3 in a third test period P_T3.

In case that the first test signal V_AINT1 having pulses of the logic high level HIGH is applied to the first common power line PLC1 in the first test period P_T1, an eighth transistor T8 of each of first color pixels (for example, eleventh to nith pixels PX11_1 to PXn1_1 and (1m−2)th to (nm−2)th pixels PX1*m*−2_1 to PXnm−2_1, which are shown in FIG. 13) connected to the first common power line PLC1 may be turned on, and only the first color pixels may emit light. For example, a lighting test on the first color pixels may be performed in the first test period P_T1.

Similarly, in case that the second test signal V_AINT2 having pulses of the logic high level HIGH is applied to the second common power line PLC2 in the second test period P_T2, an eighth transistor T8 of each of second color pixels (for example, twelfth to n2th pixels PX12_1 to PXn2_1 and (1m−1)th to (nm−1)th pixels PX1*m*−1_1 to PXnm−1_1, which are shown in FIG. 13) connected to the second common power line PLC2 may be turned on, and only the second color pixels may emit light. For example, a lighting test on the second color pixels may be performed in the second test period P_T2.

In case that the third test signal V_AINT3 having pulses of the logic high level HIGH is applied to the third common power line PLC3 in the third test period P_T3, only third color pixels (for example, thirteenth to n3th pixels PX13_1 to PXn3_1 and 1mth to nmth pixels PX1*m*_1 to PXnm_1, which are shown in FIG. 13) connected to the third common power line PLC3 may emit light. For example, a lighting test on the third color pixels may be performed in the third test period P_T3.

In the first mode, a signal having a logic low level may be supplied to the first to third common power lines PLC1 to PLC3, or any separate signal may not be supplied to the first to third common power lines PLC1 to PLC3. An eighth transistor T8 of each of the pixels PX11_1 to PXnm_1 may maintain the turn-off state.

As described above, a lighting test on the light emitting unit EMU (or the light emitting element LD) can be performed by using only one transistor, for example, the eighth transistor T8 in the pixel driving circuit PXC_1. For example, a process for the lighting test can be simplified.

Further, pixels emitting light of the same color can be grouped, and a lighting test can be sequentially performed for each group. Accordingly, whether the pixels normally emit light and/or a characteristic of the pixels can be more readily checked.

Figure 16:
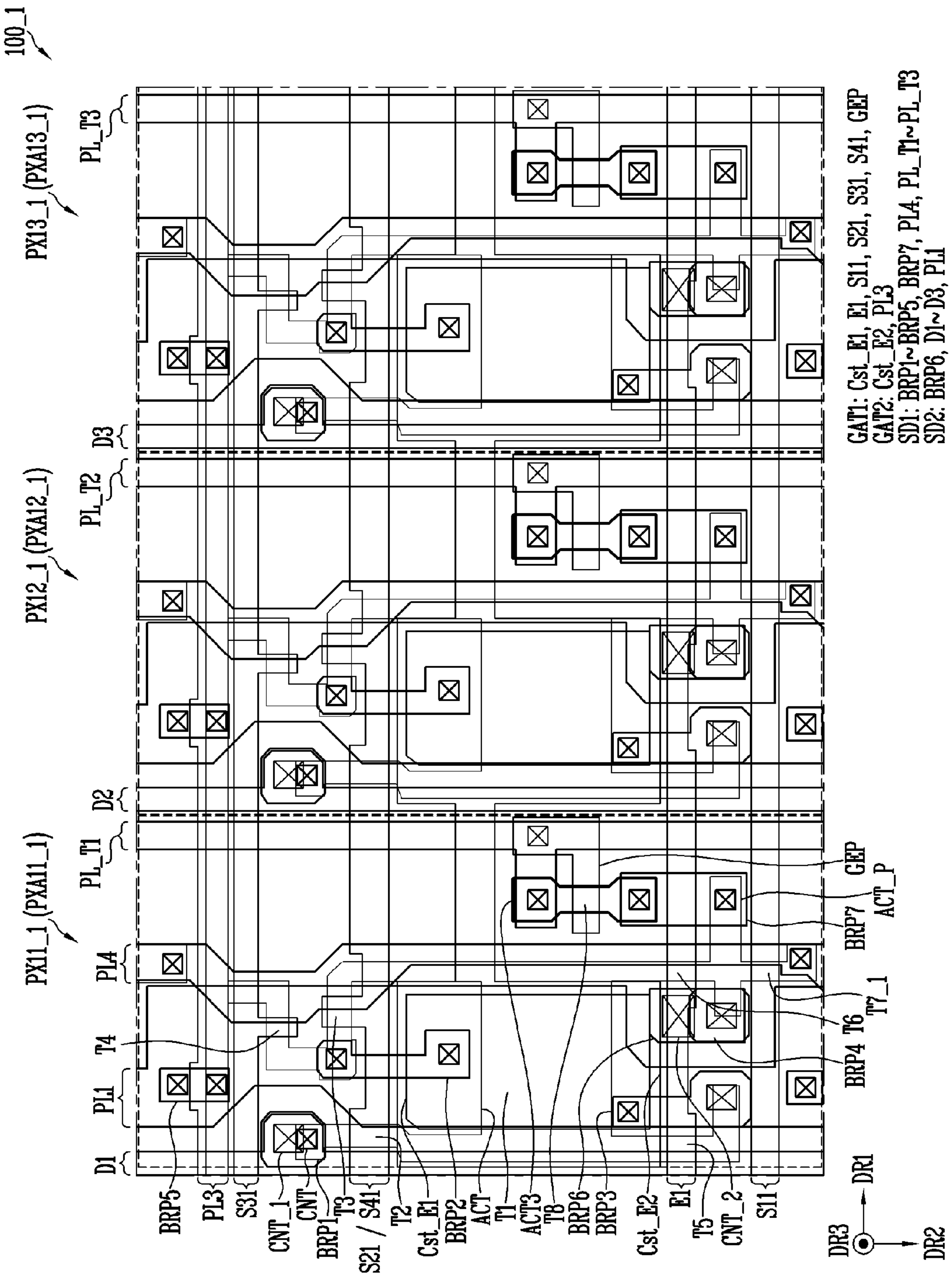
FIG. 16 is a view schematically illustrating pixels included in the display panel shown in FIG. 13, and is a schematic plan view of the pixels viewed from the top, based on a pixel driving circuit shown in FIG. 14.

FIG. 16 is a view schematically illustrating the pixels included in the display panel shown in FIG. 13, and is a schematic plan view of the pixels viewed from the top, based on the pixel driving circuit shown in FIG. 14. Since the pixels PX11_1 to PXnm_1 shown in FIG. 13 are substantially identical to one another, the eleventh to thirteenth pixels PX11_1 to PX13_1 shown in FIG. 13 are illustrated in FIG. 16 for convenience of description.

Referring to FIGS. 1, 3, 8A, 13, 14, and 16, the display panel 100_1 may include the eleventh pixel PX11_1 (or an eleventh pixel area PXA11_1), the twelfth pixel PX12_1 (or a twelfth pixel area PXA12_1), and the thirteenth pixel PX13_1 (or a thirteenth pixel area PXA13_1). The eleventh to thirteenth pixels PX11_1 to PX13_1 are substantially identical or similar to one another. Therefore, hereinafter, the eleventh pixel PX11_1 will be described, including the eleventh to thirteenth pixels PX11_1 to PX13_1. The eleventh pixel PX11_1 shown in FIG. 16 may be substantially identical or similar to the eleventh pixel PX11 shown in FIG. 8A, except an eighth transistor T8 and a component connected to or directly connected thereto. Therefore, overlapping descriptions will not be repeated.

The semiconductor layer ACT may further include a third semiconductor pattern ACT3. The third semiconductor pattern ACT3 may include a same material or a similar material as the second semiconductor pattern ACT2 (see FIG. 8B). For example, the third semiconductor pattern ACT3 may include an oxide semiconductor.

The third semiconductor pattern ACT3 may be located adjacent to the first transistor T1. For example, the third semiconductor pattern ACT3 may be located between a fourth power line PL4 and the first sub-power line PL_T1. The third semiconductor pattern ACT3 may constitute a channel region of the eighth transistor T8.

In an embodiment, the semiconductor layer ACT (or the first semiconductor pattern ACT1 (see FIG. 8B)) may further include a protrusion pattern ACT_P protruding toward the third semiconductor pattern ACT3 (or in the first direction DR1) from the sixth transistor T6. The protrusion pattern ACT_P may be a semiconductor pattern doped with an impurity. The protrusion pattern ACT_P along with a seventh bridge pattern BRP7 which will be described later may connect one electrode of the eighth transistor T8 to the fourth node N4 (see FIG. 14) (for example, a node to which the other electrode of the sixth transistor T6 is connected).

The first conductive layer GAT1 may further include a gate electrode pattern GEP. The gate electrode pattern GEP may overlap a channel region of the eighth transistor T8, and constitute a gate electrode of the eighth transistor T8. Although a case where the first conductive layer GAT1 may include the gate electrode pattern GEP has been described, the gate electrode pattern GEP is not limited thereto. For example, the gate electrode pattern GEP may be included in the second conductive layer GAT2 or be included in a conductive layer different from the first and second conductive layers GAT1 and GAT2. The position of the gate electrode pattern GEP may be variously changed within a range in which the gate electrode pattern GEP can constitute the gate electrode of the eighth transistor T8 with at least one insulating layer interposed between the gate electrode pattern GEP and the third semiconductor pattern ACT3.

The third conductive layer SD1 may further include the seventh bridge pattern BRP7 (or seventh connection pattern) and the fourth power line PL4.

The seventh bridge pattern BRP7 may overlap a first region of the eighth transistor T8, and be connected to the first region of the eighth transistor T8 through a contact hole. Also, the seventh bridge pattern BRP7 may overlap the protrusion pattern ACT_P of the semiconductor pattern ACT, and be connected to the protrusion pattern ACT_P through a contact hole.

The fourth power line PL4 may extend in the second direction DR2, and be located at the other side of the eleventh pixel area PXA11_1 in the first direction DR1 (or in an adjacent area between the eleventh pixel area PXA11_1 and the twelfth pixel area PXA12_1). The fourth power line PL4 may overlap the seventh transistor T7_1, and be connected to one electrode of the seventh transistor T7_1 through a contact hole. The fourth power line PL4 may include bent portion to partially overlap a channel region of the third and fourth transistors T3 and T4.

The first sub-power line PL_T1 may extend in the second direction DR2, and be located at the other side of the eleventh pixel area PXA11 in the first direction DR1. For example, in a plan view, the first sub-power line PL_T1 may be located between the fourth power line PL4 and the second data line D2. The first sub-power line PL_T1 may include a part protruding toward the third semiconductor pattern ACT3. The protruding part may overlap a second region of the eighth transistor T8, and be connected to the second region of the eighth transistor T8 through a contact hole. For example, the first sub-power line PL_T1 may be electrically connected to the second region of the eighth transistor T8, and constitute one electrode of the eighth transistor T8.

Also, the first sub-power line PL_T1 may overlap the gate electrode pattern GEP, and be connected to the gate electrode pattern GEP of the eighth transistor T8 through a contact hole. For example, the first sub-power line PL_T1 may be electrically connected to the gate electrode of the eighth transistor T8.

As described above, the eleventh pixel PX11_1 (or each of the pixels PX11_1 to PXn1_1) may be connected between the other electrode of the sixth transistor T6 (or the fourth node N4 (see FIG. 14)) and the first sub-power line PL_T1, and include the eighth transistor T8 connected to the first sub-power line PL_T1.

In accordance with the disclosure, the display device may include a switching transistor which is connected between a first electrode (or pixel electrode) of a light emitting unit (or light emitting element) and a first sub-power line to form a current flow path. Thus, a lighting test (or bonding test) on the light emitting unit can be readily performed by using only one switching transistor.

Further, the first sub-power line is electrically connected to pixels emitting light of the same color, and is electrically separated or disconnected from a second sub-power line connected to pixels emitting light of another color. Thus, a lighting test (or bonding test) on the pixels can be sequentially performed for each color by using the first and second sub-power lines, and whether the pixels normally emit light (or whether the light emitting element has been normally bonded to the first electrode) can be more readily checked.

Example embodiments have been disclosed herein, and although terms are employed, they are used and are to be interpreted in a generic and descriptive sense only and not for purposes of limitation. In some instances, as would be apparent to one of ordinary skill in the art, features, characteristics, and/or elements described in connection with a given embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the disclosure as set forth in the following claims.

What is claimed is:

1. A display device comprising:

a first pixel;

a second pixel; and a power supply, wherein the first pixel includes:

a first light emitting unit electrically connected between a first power line and a second power line;

a first driving transistor electrically connected between the first power line and the first light emitting unit, the first driving transistor controlling a current flowing into the first light emitting unit, based on a first data signal from a first data line to a gate electrode of the first driving transistor;

a first initialization transistor electrically connected between the gate electrode of the first driving transistor and a third power line; and a first switching transistor electrically connected between a first electrode of the first light emitting unit and a first sub-power line, the first driving transistor includes a first semiconductor material, and the first initialization transistor includes a second semiconductor material different from the first semiconductor material, wherein the second pixel includes:

a second light emitting unit electrically connected between the first power line and the second power line, a second driving transistor electrically connected between the first power line and the second light emitting unit, the second driving transistor controlling a current flowing into the second light emitting unit, based on a second data signal from a second data, line to a gate electrode of the second driving transistor;

a second initialization transistor electrically connected between the gate electrode of the second driving transistor and the third power line; and a second switching transistor electrically connected between a first electrode of the second light emitting unit and a second sub-power line, and the second sub-power line is electrically disconnected from the first sub-power line, and wherein:

the power supply applies a same voltage to the first sub-power line and the second sub-power line in a first mode; and the power supply applies different test signals respectively to the first sub-power line and the second sub-power line in a second mode.

2. The display device of claim 1, wherein the first driving transistor includes a silicon semiconductor, and the first initialization transistor incudes an oxide semiconductor.

3. The display device of claim 1, wherein the first sub-power line is electrically disconnected from the third power line.

4. The display device of claim 1, wherein, the power supply sequentially applies the test signals to the first sub-power line and the second sub-power line in the second mode.

5. The display device of claim 1, further comprising:

a third pixel, wherein the third pixel includes:

a third light emitting unit electrically connected between the first power line and the second power line;

a third driving transistor electrically connected between the first power line and the third light emitting unit, the third driving transistor controlling a current flowing into the third light emitting unit, based on a third data signal from a third data line to a gate electrode of the third driving transistor;

a third initialization transistor electrically connected between the gate electrode of the third driving transistor and the third power line; and a third switching transistor electrically connected between a first electrode of the third light emitting unit and a third sub-power line, and the third sub-power line is electrically disconnected from the first sub-power line and the second sub-power line.

6. The display device of claim 5, wherein the first pixel emits light of a first color, the second pixel emits light of a second color, the third pixel emits light of a third color, and the first color, the second color, and the third color are different colors.

7. The display device of claim 1, further comprising:

a fourth pixel, wherein the fourth pixel includes:

a fourth light emitting unit electrically connected between the first power line and the second power line;

a fourth driving transistor electrically connected between the first power line and the fourth light emitting unit, the fourth driving transistor controlling a current flowing into the fourth light emitting unit, based on a fourth data signal from a fourth data line to a gate electrode of the fourth driving transistor;

a fourth initialization transistor electrically connected between the gate electrode of the fourth driving transistor and the third power line; and a fourth switching transistor electrically connected between a first electrode of the fourth light emitting unit and a fourth sub-power line, the fourth data line is electrically disconnected from the first data line and the second data line, and the fourth sub-power line is electrically connected to the first sub-power line.

8. The display device of claim 7, wherein the first pixel and the fourth pixel emit light of a first color.

9. The display device of claim 1, wherein, the first data line, the second data line, the first sub-power line, and the second sub-power line extend in a first direction in a plan view.

10. The display device of claim 9, wherein, the second data line partially overlaps the first sub-power line in a plan view.

11. The display device of claim 1, wherein the first light emitting unit includes light emitting elements spaced apart from each other at a same distance on the first electrode of the first light emitting unit.

12. The display device of claim 11, wherein each of the light emitting elements includes:

a second semiconductor layer;

an active layer; and a first semiconductor layer, the second semiconductor layer, the active layer, and the first semiconductor layer are sequentially stacked on the first electrode of the first light emitting unit.

13. The display device of claim 1, wherein the first pixel includes a bypass transistor electrically connected between the first electrode of the first light emitting unit and a fourth power line, and a gate electrode of the first switching transistor is electrically connected to the first sub-power line.

14. The display device of claim 13, wherein the first switching transistor includes the second semiconductor material.

15. The display device of claim 1, wherein the first switching transistor provides for a parasitic capacitor of the first light emitting unit to be discharged so that unintended light emission is prevented.

16. The display device of claim 1, wherein first light emitting unit includes at least one light emitting element including a first semiconductor layer, a second semiconductor layer, and an active layer interposed between the first and second semiconductor layers.

17. A display device comprising:

a first pixel, wherein the first pixel includes:

a first light emitting unit electrically connected between a first power line and a second power line;

a first driving transistor electrically connected between the first power line and the first light emitting unit, the first driving transistor controlling a current flowing into the first light emitting unit, based on a first data signal from a first data line;

a bypass transistor electrically connected between a first electrode of the first light emitting unit and third power line; and a first switching transistor electrically connected between the first electrode of the first light emitting unit and a first sub-power line, the first switching transistor having a gate electrode connected to the first sub-power line, wherein the first driving transistor includes a first semiconductor material, and the first switching transistor includes a second semiconductor material different from the first semiconductor material, and the first driving transistor incudes a silicon semiconductor, and the first switching transistor includes an oxide semiconductor.

18. The display device of claim 17, further comprising:

a second pixel, wherein the second pixel includes:

a second light emitting unit electrically connected between the first power line and the second power line;

a second driving transistor electrically connected between the first power line and the second light emitting unit, the second driving transistor controlling a current flowing into the second light emitting unit, based on a second data signal from a second data line; and a second switching transistor electrically connected between a first electrode of the second light emitting unit and a second sub-power line, the second switching transistor having a gate electrode electrically connected to the second sub-power line, wherein the second sub-power line is electrically disconnected from the first sub-power line.

19. The display device of claim 18, wherein, the first data line, the second data line, the first sub-power line, and the second sub-power line extend in a first direction in a plan view.

20. The display device of claim 17, wherein, the first sub-power line supplies a test voltage to the first electrode of the first light emitting unit.

* * * * *